United States Patent
Park et al.

(10) Patent No.: US 11,228,462 B2
(45) Date of Patent: Jan. 18, 2022

(54) METHOD FOR TRANSMITTING OR RECEIVING SOUNDING REFERENCE SIGNAL IN WIRELESS COMMUNICATION SYSTEM SUPPORTING UNLICENSED BAND, AND DEVICE FOR SUPPORTING SAME

(71) Applicant: LG ELECTRONICS INC., Seoul (KR)

(72) Inventors: Hanjun Park, Seoul (KR); Joonkui Ahn, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 762 days.

(21) Appl. No.: 16/071,225

(22) PCT Filed: Jan. 19, 2017

(86) PCT No.: PCT/KR2017/000668
§ 371 (c)(1),
(2) Date: Jul. 19, 2018

(87) PCT Pub. No.: WO2017/126907
PCT Pub. Date: Jul. 27, 2017

(65) Prior Publication Data
US 2021/0203528 A1 Jul. 1, 2021

Related U.S. Application Data

(60) Provisional application No. 62/280,125, filed on Jan. 19, 2016, provisional application No. 62/294,305, (Continued)

(51) Int. Cl.
*H04W 72/04* (2009.01)
*H04L 25/02* (2006.01)
(Continued)

(52) U.S. Cl.
CPC ...... *H04L 25/0226* (2013.01); *H04J 13/0062* (2013.01); *H04L 5/0051* (2013.01);
(Continued)

(58) Field of Classification Search
CPC .......... H04W 72/042; H04W 72/0446; H04W 72/0453; H04W 74/0816; H04L 25/0226; H04L 5/0051; H04J 13/0062
See application file for complete search history.

(56) References Cited

U.S. PATENT DOCUMENTS

2013/0294318 A1* 11/2013 Amerga ................ H04W 4/06
370/312
2014/0119302 A1 5/2014 Ahn et al.
(Continued)

FOREIGN PATENT DOCUMENTS

| WO | WO 2012/036704 A1 | 3/2012 |
| WO | WO 2013/066116 A1 | 4/2013 |
| WO | WO 2016/006847 A1 | 1/2016 |

*Primary Examiner* — Wei Zhao
(74) *Attorney, Agent, or Firm* — Birch, Stewart, Kolasch & Birch, LLP

(57) ABSTRACT

The present invention provides a method for transmitting or receiving an uplink signal between a base station and a terminal in a licensed assisted access (LAA) system in which a base station or a terminal performs listen-before-talk (LBT)-based signal transmission, and a device for supporting the same. Particularly, the present invention provides a method for transmitting an uplink signal by a base station and a terminal according to a scheduling type, which the base station indicates to the terminal, and a device for supporting the same.

10 Claims, 18 Drawing Sheets

Related U.S. Application Data filed on Feb. 12, 2016, provisional application No. 62/307,579, filed on Mar. 14, 2016, provisional application No. 62/316,531, filed on Mar. 31, 2016.

(51) Int. Cl.
*H04J 13/00* (2011.01)
*H04L 5/00* (2006.01)
*H04W 74/08* (2009.01)

(52) U.S. Cl.
CPC ..... *H04W 72/042* (2013.01); *H04W 72/0446* (2013.01); *H04W 72/0453* (2013.01); *H04W 74/0816* (2013.01)

(56) References Cited

U.S. PATENT DOCUMENTS

| | | |
|---|---|---|
| 2015/0358826 A1 | 12/2015 | Wei et al. |
| 2016/0143014 A1* | 5/2016 | Mukherjee ............ H04L 5/0039 370/330 |
| 2018/0323917 A1* | 11/2018 | Um ....................... H04L 5/0053 |

* cited by examiner

FIG. 9
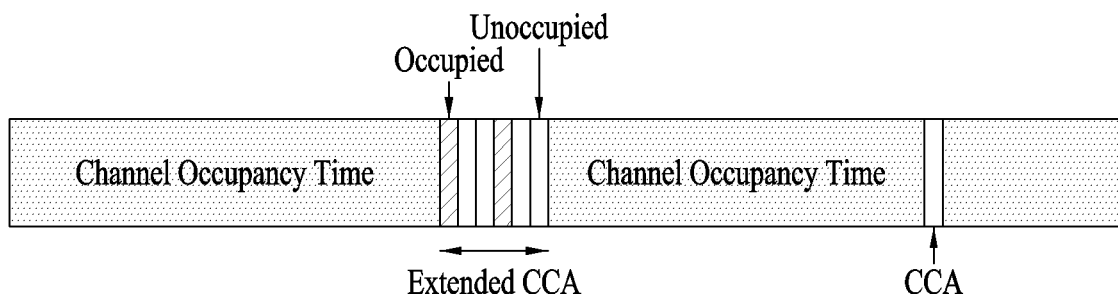
(a)
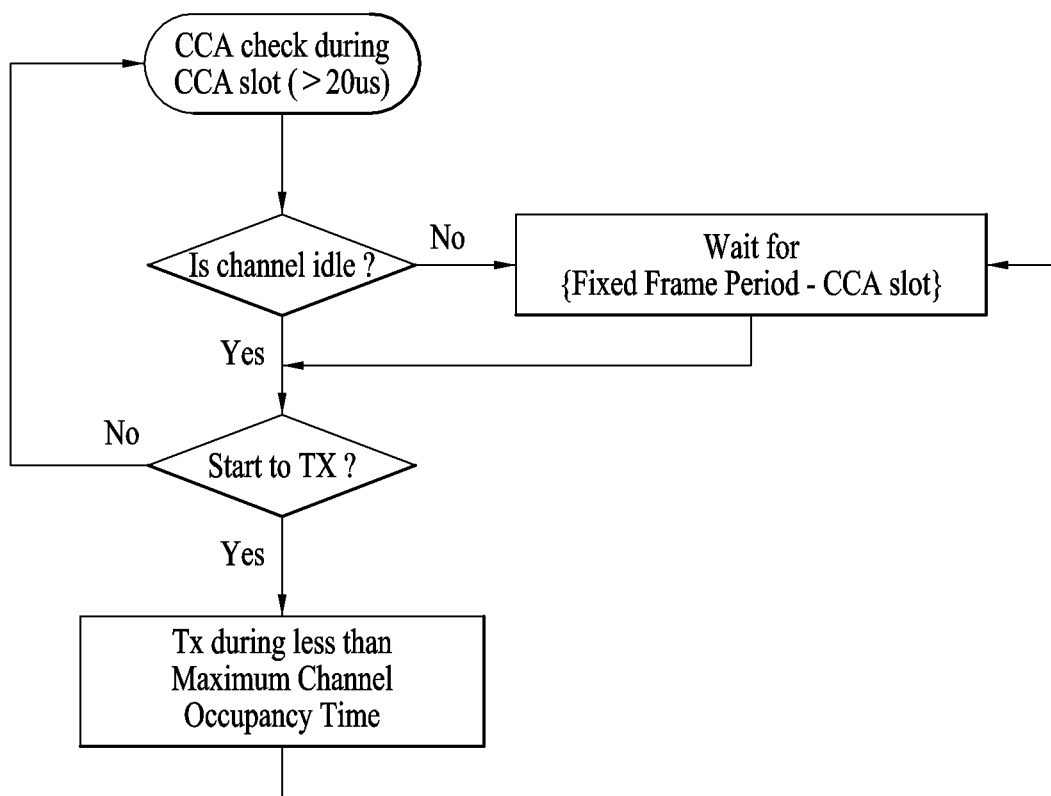
(b)

METHOD FOR TRANSMITTING OR RECEIVING SOUNDING REFERENCE SIGNAL IN WIRELESS COMMUNICATION SYSTEM SUPPORTING UNLICENSED BAND, AND DEVICE FOR SUPPORTING SAME

CROSS REFERENCE TO RELATED APPLICATIONS

This application is the National Phase of PCT International Application No. PCT/KR2017/000668, filed on Jan. 19, 2017, which claims priority under 35 U.S.C. 119(e) to U.S. Provisional Application No. 62/280,125, filed on Jan. 19, 2016, 62/294,305 filed on Feb. 12, 2016, 62/307,579 filed on Mar. 14, 2016, and 62/316,531 filed on Mar. 31, 2016, all of which are hereby expressly incorporated by reference into the present application.

TECHNICAL FIELD

The following description relates to a wireless communication system supporting an unlicensed band and, more particularly, to a method of transmitting and receiving a sounding reference signal between a user equipment (UE) and a base station in a wireless communication system supporting an unlicensed band, and devices supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide a method of transmitting and receiving a sounding reference signal between a user equipment (UE) and a base station when the base station or the UE performs listen-before-talk (LBT) based signal transmission.

In particular, an object of the present invention is to provide a method of efficiently transmitting and receiving a sounding reference signal between a specific UE and a base station in an unlicensed band of a licensed assisted access (LAA) system supporting LBT based opportunistic (or competitive) transmission.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method of transmitting and receiving a sounding reference signal between a user equipment (UE) and a base station in a wireless communication system, and devices therefor.

The object of the present invention can be achieved by providing a method of transmitting a sounding reference signal (SRS) from a user equipment (UE) to a base station in a wireless communication system supporting an unlicensed band comprising receiving SRS subframe information from the base station and transmitting the SRS together in a subframe, in which a physical uplink shared channel (PUSCH) is transmitted, among subframes indicated by the SRS subframe information.

At this time, the SRS subframe information may comprise cell-specific SRS subframe information and UE-specific SRS subframe information, and the subframes indicated by the SRS subframe information may comprise subframes commonly indicated by the cell-specific SRS subframe information and the UE-specific SRS subframe information.

Upon receiving an SRS request from the base station in an N-th subframe, the UE may transmit the SRS together in the subframe, in which the PUSCH is transmitted after an (N+K)-th subframe, among the subframes indicated by the SRS subframe information, where N and K are integers.

K may be set to one of a value predetermined between the base station and the UE, a value set by a higher layer signal of the base station, and a value indicated by a control signal received from the base station.

The UE may transmit the SRS together only in the subframe, in which the PUSCH is transmitted, without including a predetermined time gap, in which signal transmission is not performed, among the subframes indicated by the SRS subframe information.

The UE may receive a control signal indicating puncturing or rate matching of an SRS symbol of a specific subframe, and transmit data by performing puncturing or rate matching with respect to the SRS symbol of the specific subframe.

In particular, the UE may transmit a reservation signal in the SRS symbol of the specific subframe.

The PUSCH and the SRS may be transmitted in the unlicensed band.

In another aspect of the present invention, provided herein is a method of, at a base station, receiving a sounding reference signal (SRS) from a user equipment (UE) in a wireless communication system supporting an unlicensed band including transmitting SRS subframe information to the UE and receiving the SRS together in a subframe, in which a physical uplink shared channel (PUSCH) is transmitted, among subframes indicated by the SRS subframe information.

At this time, the SRS subframe information may comprise cell-specific SRS subframe information and UE-specific SRS subframe information, and the subframes indicated by the SRS subframe information may comprise subframes commonly indicated by the cell-specific SRS subframe information and the UE-specific SRS subframe information.

Upon transmitting an SRS request to the UE in an N-th subframe, the base station may receive the SRS together in the subframe, in which the PUSCH is transmitted after an (N+K)-th subframe, among the subframes indicated by the SRS subframe information, where N and K are integers.

K may be set to one of a value predetermined between the base station and the UE, a value set by a higher layer signal of the base station, and a value indicated by a control signal received from the base station.

The base station may receive the SRS together only in the subframe, in which the PUSCH is transmitted, without including a predetermined time gap, in which signal transmission is not performed, among the subframes indicated by the SRS subframe information.

The PUSCH and the SRS may be transmitted in the unlicensed band.

In another aspect of the present invention, provided herein is a user equipment (UE) for transmitting a sounding reference signal (SRS) to a base station in a wireless communication system supporting an unlicensed band comprising a receiver, a transmitter, and a processor connected to the receiver and the transmitter to operate, wherein the processor is configured to receive SRS subframe information from the base station and to transmit the SRS together in a subframe, in which a physical uplink shared channel (PUSCH) is transmitted, among subframes indicated by the SRS subframe information.

In another aspect of the present invention, provided herein is a base station for receiving a sounding reference signal (SRS) from a user equipment (UE) in a wireless communication system supporting an unlicensed band comprising a receiver, a transmitter, and a processor connected to the receiver and the transmitter to operate, wherein the processor is configured to transmit SRS subframe information to the UE and to receive the SRS together in a subframe, in which a physical uplink shared channel (PUSCH) is transmitted, among subframes indicated by the SRS subframe information.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

As is apparent from the above description, the embodiments of the present disclosure have the following effects.

According to the present invention, it is possible to provide a method of transmitting and receiving a sounding reference signal between a user equipment (UE) and a base station when the base station or the UE performs listen-before-talk (LBT) based signal transmission.

In particular, in the present invention, it is possible to provide a method of efficiently transmitting and receiving a sounding reference signal between a specific UE and a base station in an unlicensed band of a licensed assisted access (LAA) system supporting LBT-based opportunistic (or competitive) transmission.

Effects obtainable from the present invention are non-limited by the above mentioned effect. And, other unmentioned effects can be clearly understood from the following description by those having ordinary skill in the technical field to which the present invention pertains. That is, effects which are not intended by the present invention may be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 9 is a diagram illustrating an exemplary Load Based Equipment (LBE) operation as one of the LBT operations;

BEST MODE

Figure 1:
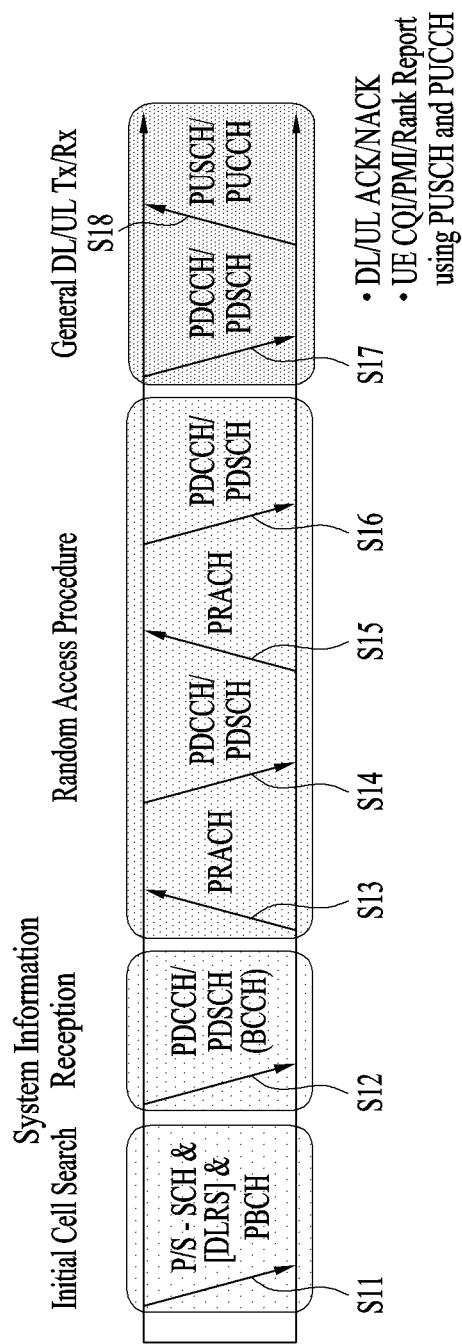
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
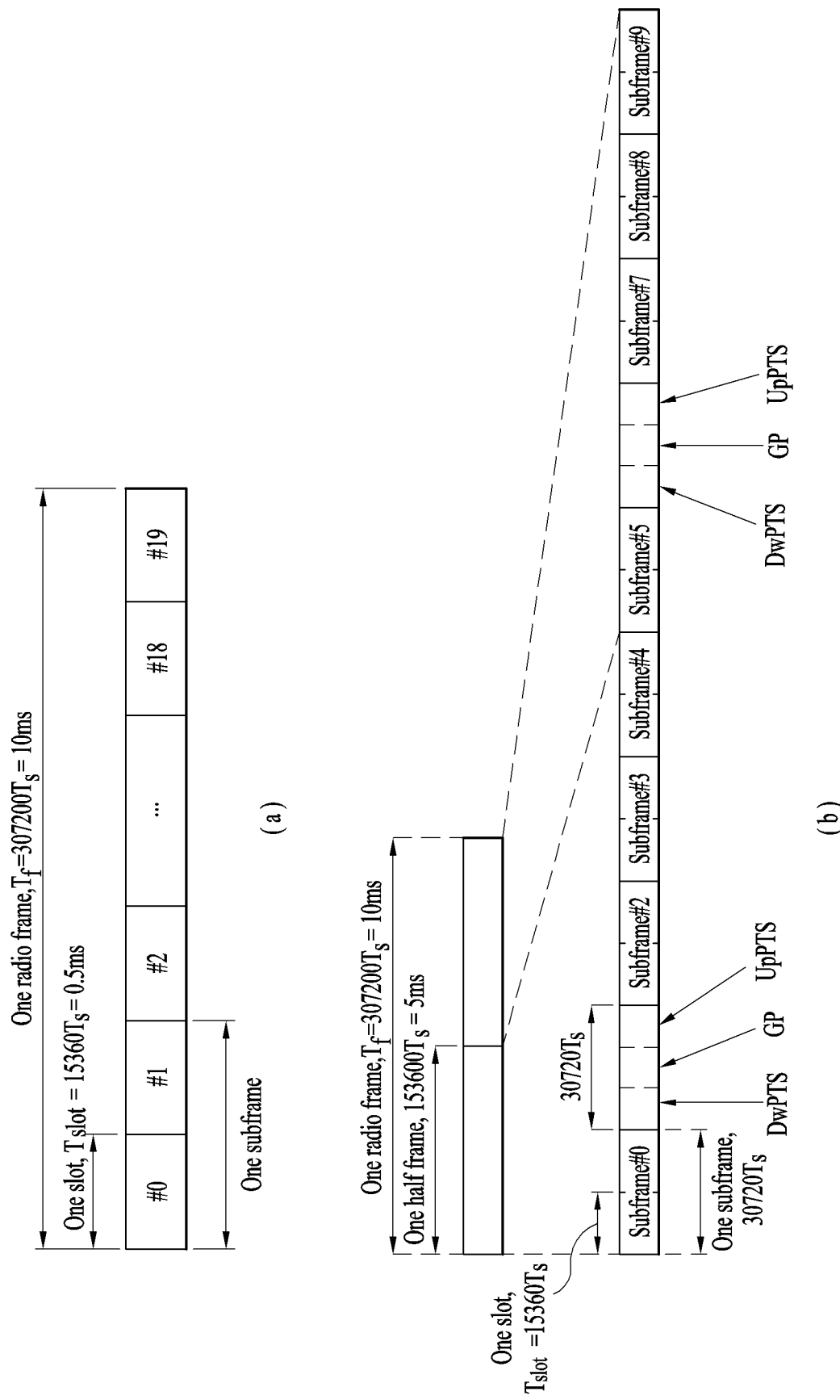
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cyclic prefix in downlink | | Extended cyclic prefix in downlink | |
| | | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
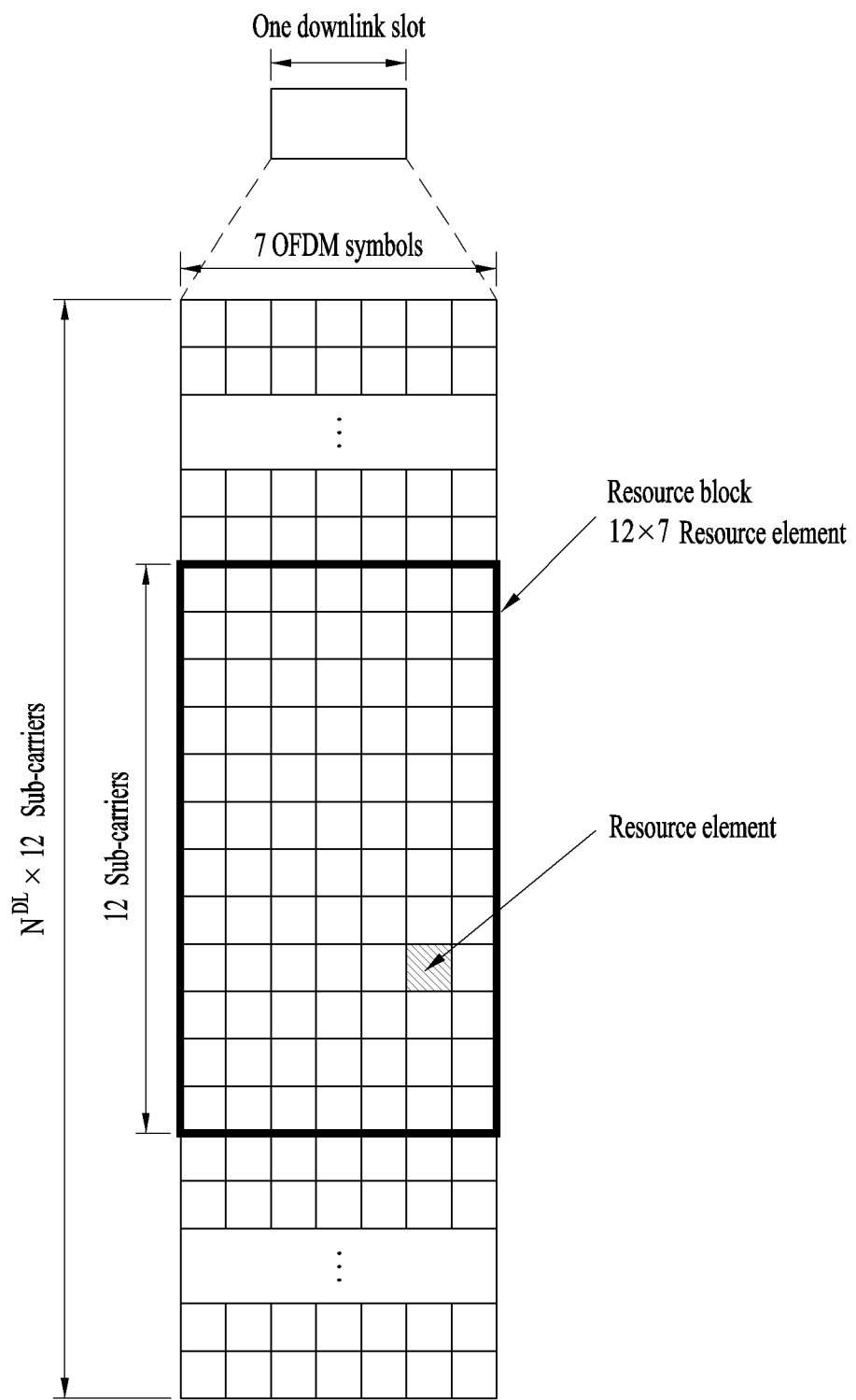
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A structure of an uplink slot may be identical to a structure of a downlink slot.

Figure 4:
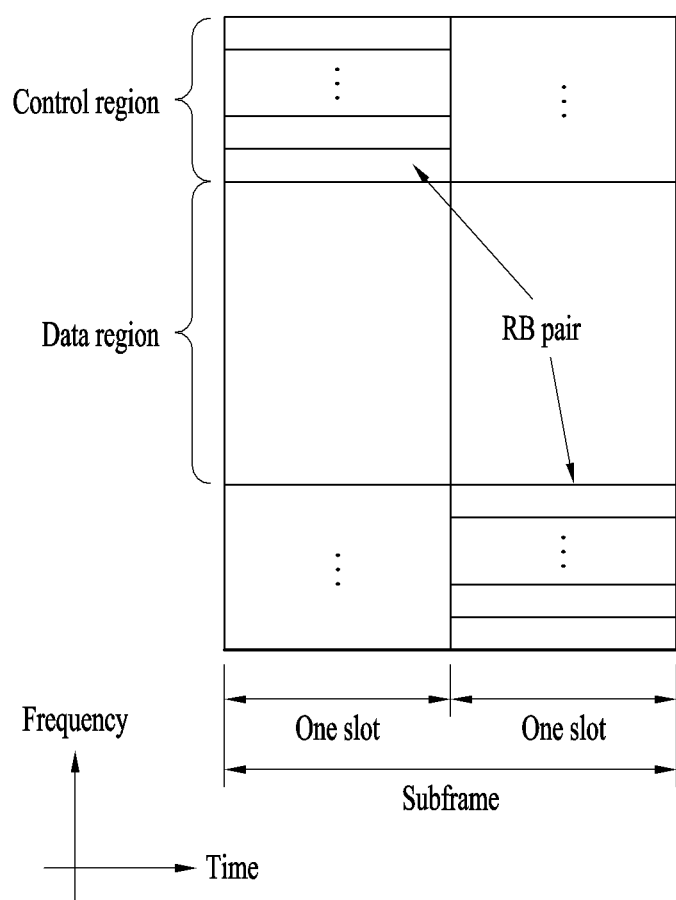
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

Figure 5:
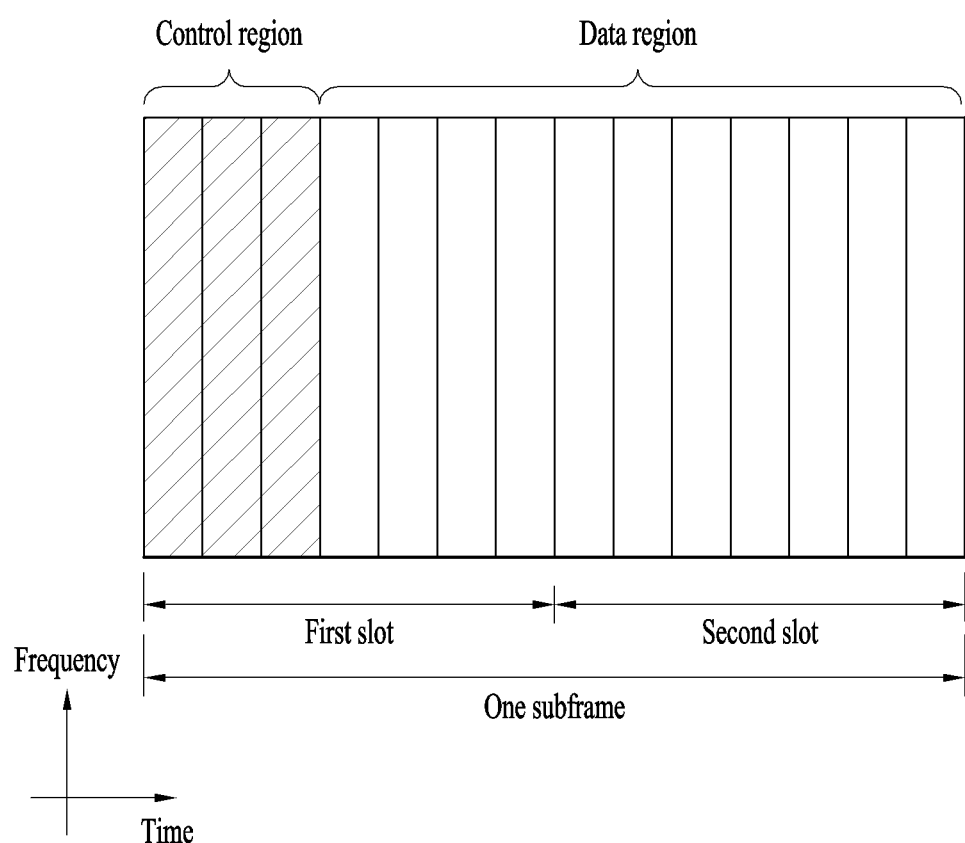
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. LTE-U System 2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
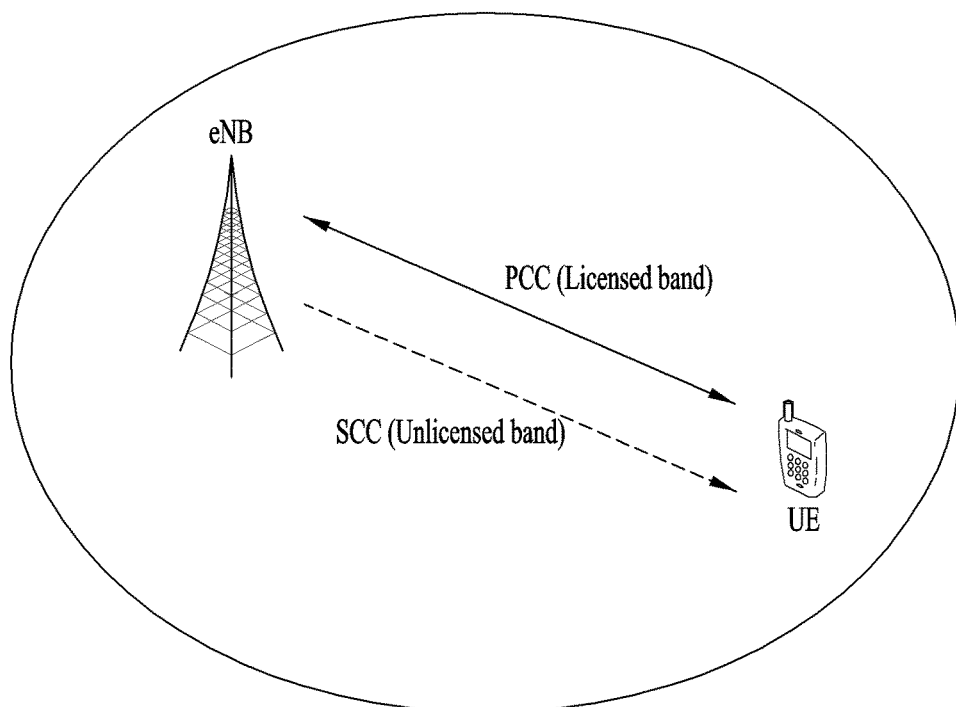
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
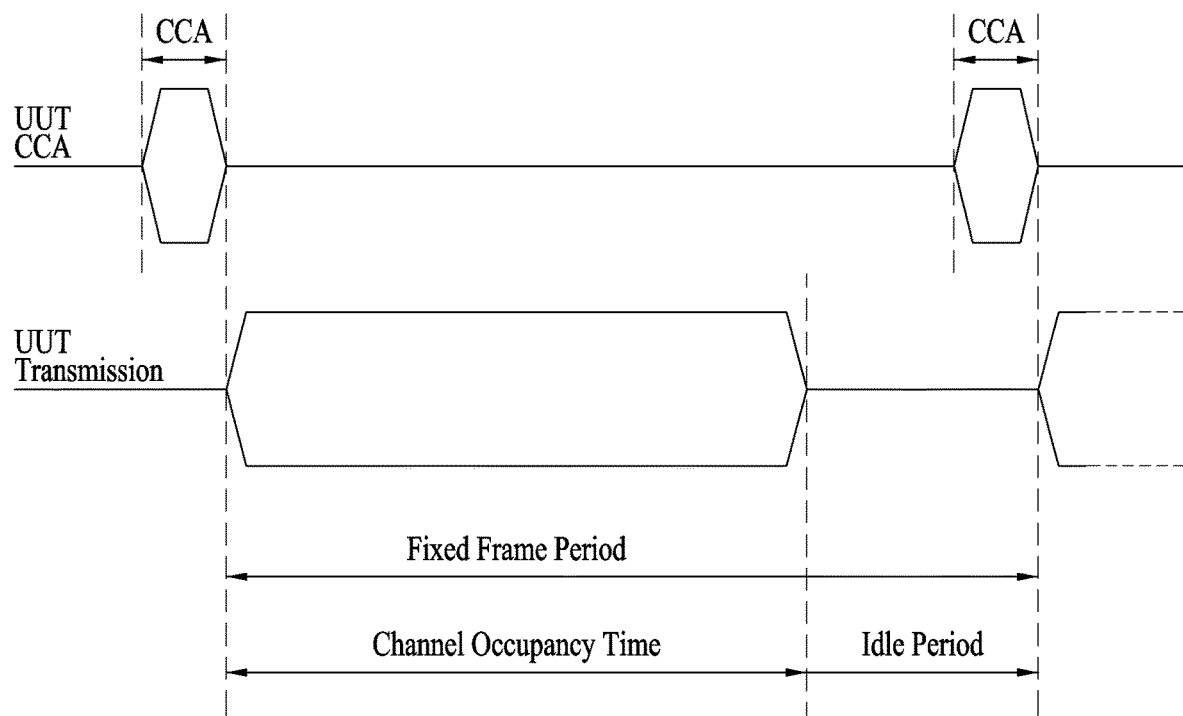
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 µs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
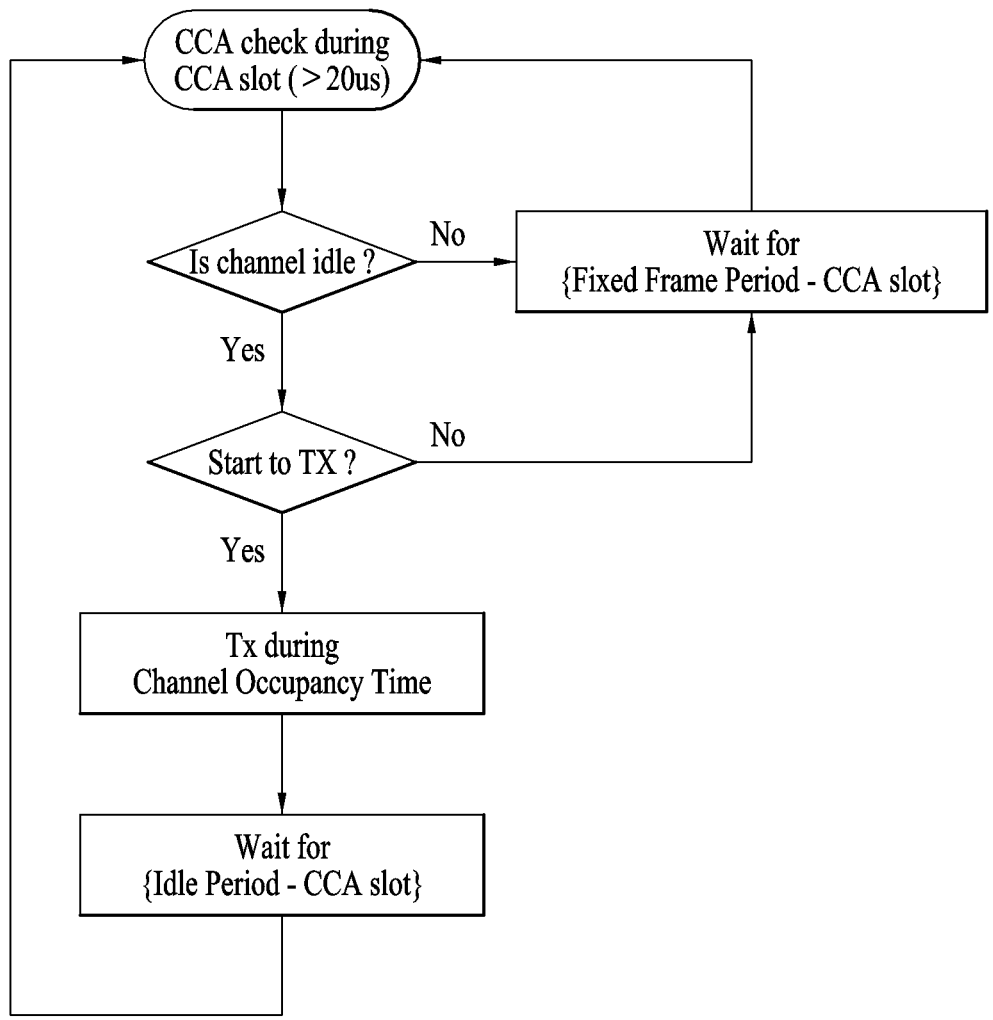
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot. If the channel is idle, the communication node performs data transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

FIG. 9 is a view illustrating an exemplary LBE operation as one of the LBT operations.

Referring to FIG. 9(a), in LBE, the communication node first sets q (q ∈ {4, 5, . . . , 32}) and then performs CCA during one CCA slot.

FIG. 9(b) is a block diagram illustrating the LBE operation. The LBE operation will be described with reference to FIG. 9(b).

The communication node may perform CCA during a CCA slot. If the channel is unoccupied in a first CCA slot, the communication node may transmit data by securing a time period of up to (13/32)q ms.

On the contrary, if the channel is occupied in the first CCA slot, the communication node selects N (N ∈ {1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms.

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
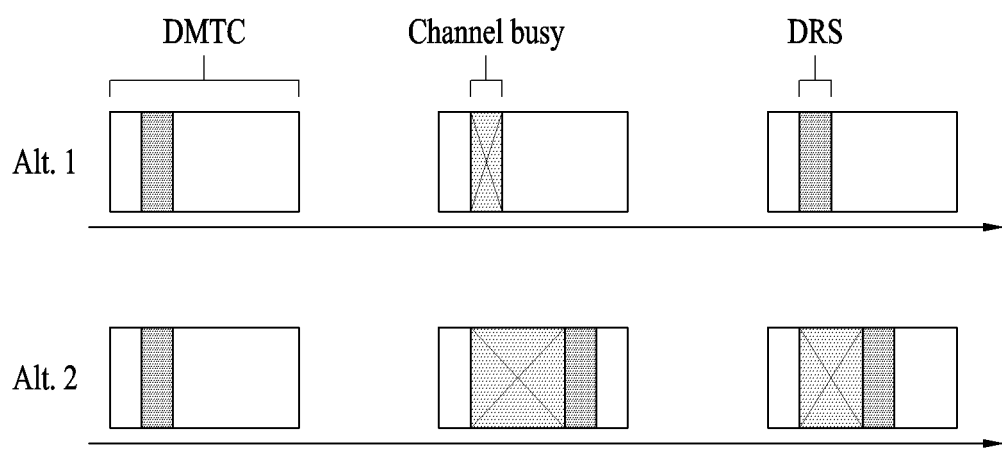
FIG. 10 is a diagram for explaining methods of transmitting a DRS supported in an LAA system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
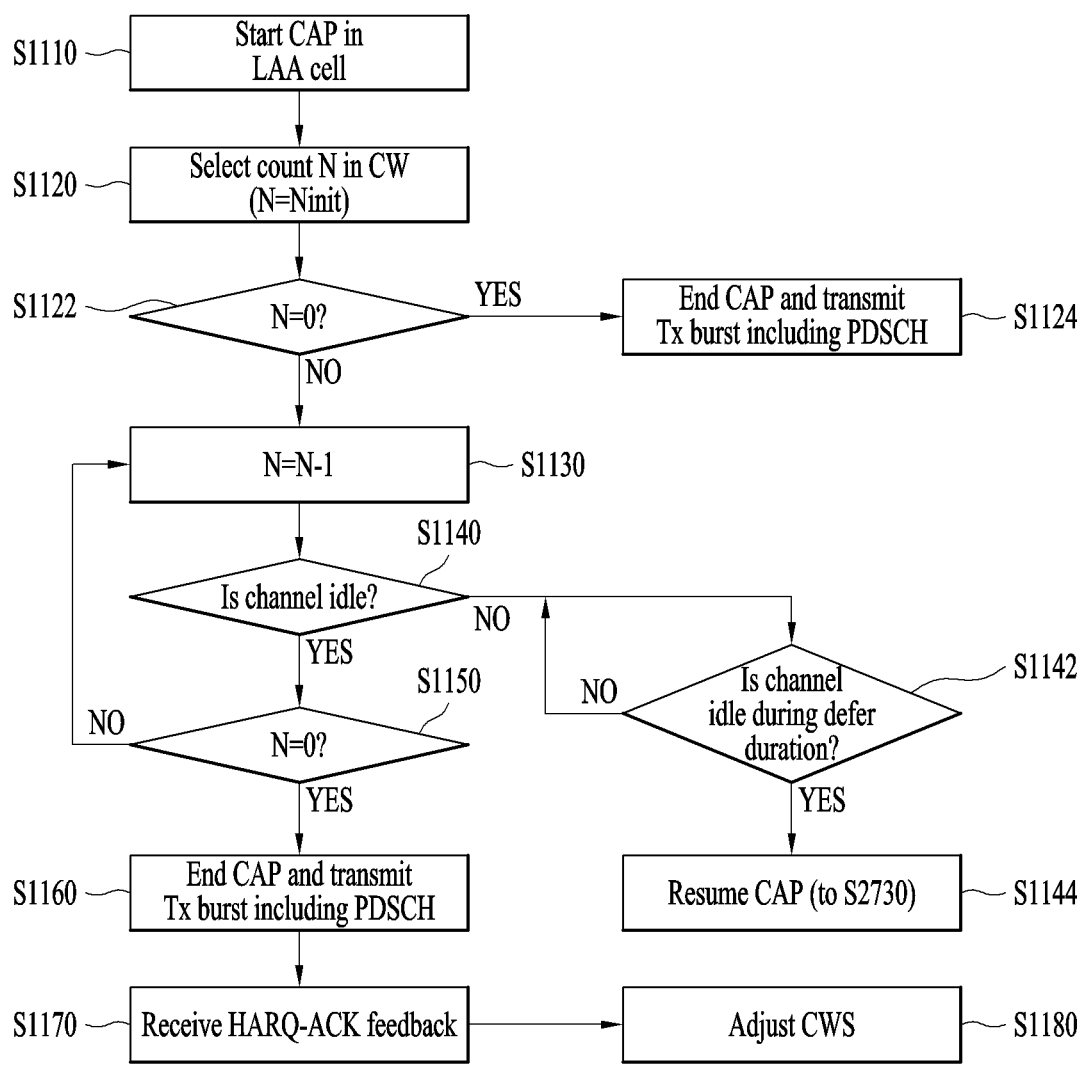
FIG. 11 is a flowchart for explaining CAP and CWA.

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

3. Proposed Embodiment

The present invention proposes a method of transmitting a sounding reference signal (SRS), to which uplink (UL) listen-before-talk (LBT) is applied, when a base station or a user equipment (UE) performs LBT based signal transmission in a wireless communication system including the base station and the UE.

As described above in detail, the base station or the UE confirms whether signal transmission of another communication node is performed through LBT operation. Such operation may be referred to as carrier sensing (CS) or clear channel assessment (CCA). Upon determining that there is no signal transmission of another communication node as the result of CCA, this is defined as a channel unoccupied (or channel idle) state and, upon determining that there is signal transmission, this is defined as a channel occupied (or channel busy) state.

The base station or UE according to the present invention should perform LBT in order to perform signal transmission in an unlicensed band and should not cause signal interference with other communication nodes such as Wi-Fi during signal transmission. For example, in the Wi-Fi standard (e.g., 801.11ac), a CCA threshold is set to −62 dBM with respect to a non-Wi-Fi signal and to −82 dBm with respect to a Wi-Fi signal. This means that, when a station (STA) or an access point (AP) senses a signal other than a Wi-Fi signal received with power (or energy) of −62 dBM or more, the STA or the AP does not perform signal transmission.

Hereinafter, in the present invention, for convenience of description, a series of signals transmitted by a transmission node within a maximum channel occupancy time after LBT operation is referred to as a Tx burst and a series of signals composed of only data signals of the Tx burst is referred to as data burst. At this time, the Tx burst may include a reservation signal or an initial signal.

The base station of a 3GPP LTE system may allow a UE to transmit an SRS for the purpose of measuring an uplink channel environment. The SRS may be used for channel measurement of a portion of total uplink channel bandwidth, and the base station may perform a frequency selective scheduling and link adaptation process based on the measured uplink channel information.

In addition, the channel information measured from the SRS may be used for downlink transmission using reciprocity between a downlink channel and an uplink channel in a TDD based system. The SRS may be used to measure an angle of arrival (AOA) in downlink beamforming or location based services.

The base station informs the UE of cell common SRS information through system information block 2 (SIB2) and provides UE-specific SRS information through RRC signaling. The SRS information transmitted through SIB2 and the SRS information transmitted through RRC signaling are shown in Tables 2 and 3 below.

TABLE 2

| Information Elements | | |
|---|---|---|
| Uplink Sounding Reference Signal Configuration Common | Setup | SRS Bandwidth Configuration SRS Subframe Configuration A/N + SRS Simultaneous TX SRS Max UpPTS (TDD) |

TABLE 3

| Information Elements | | |
|---|---|---|
| Uplink Sounding Reference Signal Configuration Dedicated | Setup | SRS Bandwidth SRS Hopping Bandwidth Frequency Domain Position Duration SRS Configuration index Transmission Comb Cyclic Shift |

The SRS bandwidth configuration of Table 2 indicates one of values of 0 to 7 and SRS bandwidth indicates one of values of 0 to 3. For example, when the channel bandwidth of the system is 1.4 MHz, 3 MHz or 5 MHz, the above two parameters may indicate the lookup table of Table 4 below.

where, $m_{SRS}$ denotes the number of resource blocks (RBs) in which the SRS is transmitted, and $N_X$ (where, X=0, 1, 2, 3) means one of parameters for setting a frequency position where the SRS is transmitted. Therefore, $N_X$ may be used to calculate a frequency axis start position (e.g., a lowest subcarrier) of the SRS along with $m_{SRS}$ and a frequency domain position which may have one of values of 0 to 23.

In the embodiment applicable to the present invention, a smallest transmission band in which the SRS may be transmitted in the frequency axis is 4 RBs. In general, the smaller the SRS transmission band, the smaller channel information which may be acquired by the base station. However, since a UE located in a cell boundary region has insufficient transmit power to perform wideband transmission, it may be more advantageous for the UE to perform transmission with collected transmit power in a small SRS transmission band.

In the case of narrow band SRS transmission, frequency hopping is applied to the SRS in order to measure an entire channel band. Whether frequency hopping is applied may be determined through the SRS hopping bandwidth parameter of Table 3. The SRS hopping bandwidth parameter indicates one of values of 0, 1, 2 and 3 and, when the SRS hopping bandwidth is less than the SRS bandwidth, frequency hopping is activated and, otherwise, frequency hopping is not activated.

Meanwhile, in the case of wideband SRS transmission, the number of SRSs which may be simultaneously transmitted by a plurality of UEs may be limited. In the LTE system, in order to solve the above problems, the SRS was configured to be transmitted using an interleaved frequency division multiple access (IFDMA) method. A transmission comb parameter indicates a value of 0 or 1 and each UE may be configured to transmit the SRS through a frequency band having an odd or even subcarrier index. Accordingly, in one SF-FDMA symbol, a resource region may be divided into two regions as transmission comb. Additional multiplexing capacity can be achieved through a cyclic shift (CS). The base station may indicate a CS applied to the SRS among eight different CSs through a cyclic shift parameter.

In Table 2, a cell-specific SRS subframe configuration value transmitted through SIB2 may be allocated one of values of 0 to 15. Here, each value indicates the position of a subframe in which the SRS may be activated in units of a radio frame composed of 10 subframes. For example, FDD may be expressed as shown in Table 5 below.

TABLE 4

| SRS Bandwidth Configuration | SRS Bandwidth = 0 | | SRS Bandwidth = 1 | | SRS Bandwidth = 2 | | SRS Bandwidth = 3 | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 34 | 1 | 4 | 6 | 4 | 1 | 4 | 1 |
| 3 | 30 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 5

| SRS Subframe Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | ✓ | ✓ | ✓ | ✓ | ✓ | ✓ | ✓ | ✓ | ✓ | ✓ |
| 1 | ✓ | | ✓ | | ✓ | | ✓ | ✓ | | |
| 2 | | ✓ | | ✓ | | ✓ | | ✓ | | ✓ |
| 3 | ✓ | | | | | ✓ | | | | |
| 4 | | ✓ | | | | | ✓ | | | |
| 5 | | | ✓ | | | | | ✓ | | |
| 6 | | | | ✓ | | | ✓ | | | ✓ |
| 7 | ✓ | ✓ | | | | ✓ | ✓ | | | |
| 8 | | | ✓ | ✓ | | | | | ✓ | ✓ |
| 9 | ✓ | | | | | | | | | |
| 10 | | ✓ | | | | | | | | |
| 11 | | | | ✓ | | | | | | |
| 12 | | | | | | ✓ | | | | |
| 13 | ✓ | ✓ | ✓ | ✓ | ✓ | | ✓ | | ✓ | |
| 14 | ✓ | ✓ | ✓ | ✓ | ✓ | ✓ | ✓ | | ✓ | |

In Table 5, a value of 15 among the SRS subframe configuration parameters is currently in a reserved state. A subframe set in which the UE actually transmits the SRS is determined by combining the SRS subframe configuration and the SRS configuration index. The SRS configuration index determines an SRS periodicity and an SRS subframe offset. In an FDD system or a TDD system in which the SRS periodicity exceeds 2 ms, the SRS transmission subframe is a cell-specific SRS subframe and may be defined as a subframe satisfying the following condition.

$$(10 n_f + k_{SRS} + T_{offset}) \bmod T_{SRS} = 0 \quad \text{[Equation 1]}$$

where, $n_f$ denotes the system frame number, which indicates one of values of 0 to 1023, $k_{SRS}$ for the FDD system denotes the subframe index within a specific radio frame, which indicates one of values of 0 to 9. $T_{SRS,1}$ means the SRS periodicity for triggering type 1, and $T_{offset,1}$ denotes the SRS subframe offset for triggering type 1.

Hereinafter, a method of, at a UE, transmitting an SRS in an unlicensed band according to each embodiment of the present invention will be described in detail. At this time, each embodiment may be performed independently of the other embodiments. Accordingly, a plurality of embodiments may be simultaneously performed according to implementation.

3.1 First Embodiment

When a UE transmits an SRS, the UE transmits the SRS in a subframe satisfying one or more of the following conditions among subframes included in both a cell-specific SRS subframe and a UE-specific SRS subframe (e.g., SRS configuration index).

(1) a subframe in which a PUSCH (or a PUCCH) is transmitted; and (2) a subframe in which a PUSCH (or a PUCCH) to be transmitted after an SRS symbol in which the SRS is transmitted is present.

Preferably, the first embodiment is applicable to periodic SRS transmission of triggering type 0. Therefore, as the subframes included in both the cell-specific SRS subframe and the UE-specific SRS subframe, subframes configured such that SRS triggering type 0 is transmittable are applicable.

In the LTE system, the UE may transmit the SRS of SRS triggering type 0 in the common subframes of the subframes indicated in the cell-specific SRS subframe configuration and the subframes indicated in the SRS configuration index. In contrast, in an LAA system for performing LBT-based opportunistic transmission, even when the base station expects SRS transmission, the UE may not transmit the SRS according to the uplink LBT result of the UE. In other words, the SRS may not be transmitted.

In order to solve this, the base station may detect the SRS in the subframe in which the SRS is expected to be transmitted, thereby determining whether the SRS is transmitted. However, detection depending on the SRS signal alone may have low detection performance.

Therefore, the present invention proposes a method of transmitting an SRS together with another signal capable of being easily detected and, more particularly, proposes a method of transmitting an SRS and a PUSCH together.

Figure 12:
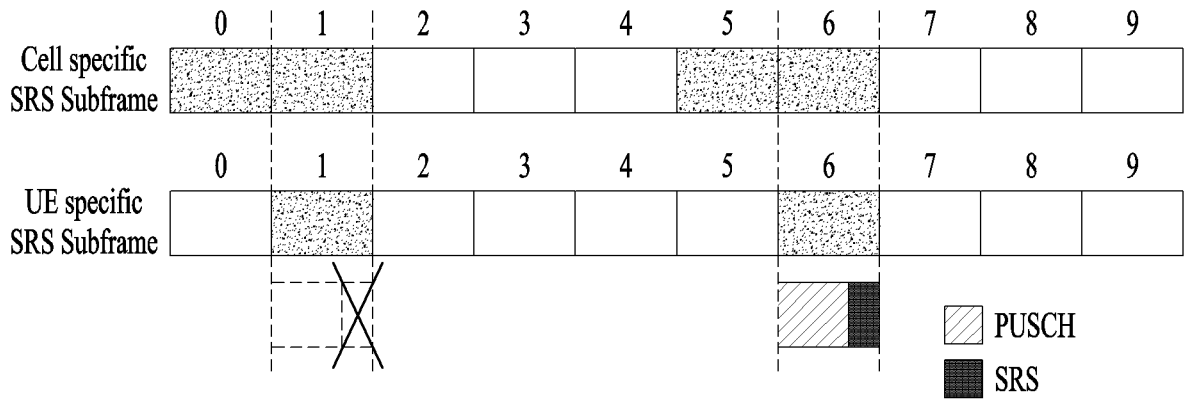
FIGS. 12 to 19 are views showing operation of transmitting an SRS according to an embodiment of the present invention.

FIG. 12 is a view showing operation of transmitting an SRS according to an embodiment of the present invention.

In FIG. 12, a cell-specific SRS subframe and a UE-specific SRS subframe are shown and the intersection of the cell-specific SRS subframe and the UE-specific SRS subframe is configured as a subframe in which SRS transmission is possible (the subframes corresponding to subframe indices 1 and 6).

Here, the subframes corresponding to subframe indices 1 and 6 correspond to the subframes indicated in the cell-specific SRS subframe configuration and the subframes indicated in the SRS configuration index. However, since the PUSCH is not transmitted in the subframe corresponding to subframe index 1 and is transmitted in the subframe corresponding to subframe index 6, the UE may transmit the SRS only in the subframe corresponding to subframe index 6.

Additionally, in the LAA system, a time gap (hereinafter, referred to as a transmission gap) in which signal transmission is not performed within a subframe for continuous Tx burst transmission may be configured. At this time, when the transmission gap is configured in back symbols of a specific subframe (e.g., one or more symbols located behind in terms of time among the symbols included in the specific subframe), the SRS transmitted in a last symbol of the specific subframe may not be transmitted in the LTE system. Therefore, in the present invention, when PUSCH transmission is instructed through an uplink grant and SRS transmission is instructed in a previous symbol to a symbol in which the PUSCH is transmitted, the UE may perform uplink LBT prior to SRS transmission and then sequentially transmit the SRS and the PUSCH. Therefore, as a subframe in which the SRS may be transmitted, a subframe in which the PUSCH to be transmitted after the SRS symbol in which the SRS is transmitted in the specific subframe is present is applicable.

3.2 Second Embodiment

When a UE transmits an SRS, the UE transmits the SRS in a subframe which satisfies one or more of the following conditions among subframes included in both a cell-specific SRS subframe and a UE-specific SRS subframe (e.g., an SRS configuration index) as one of (n+k)-th (e.g., k≥4) subframes corresponding to an SRS request received in an n-th subframe.

(1) an earliest subframe in which a PUSCH (or a PUCCH) is transmitted; and (2) an earliest subframe in terms of time among subframes in which a PUSCH (or a PUCCH) to be transmitted after the SRS symbol in which the SRS is transmitted is present.

Preferably, the second embodiment is applicable to aperiodic SRS transmission of triggering type 1. Therefore, as subframes included in both the cell-specific SRS subframe and the UE-specific SRS subframe, subframes configured such that SRS triggering type 1 is transmittable are applicable.

Similarly to the first embodiment, even in the second embodiment (more particularly, in the case of aperiodic SRS transmission) according to the present invention, the SRS is transmitted in a subframe in which the PUSCH is transmitted.

For example, when the UE according to the present invention receives an uplink grant including an SRS request (or SRS triggering) through an n-th subframe, the UE may transmit the SRS in a last symbol of the subframe which is included in both the cell-specific SRS subframe and the UE-specific SRS subframe among the (n+4)-th subframe and the subsequent subframes thereof and in which the PUSCH is transmitted.

Figure 13:
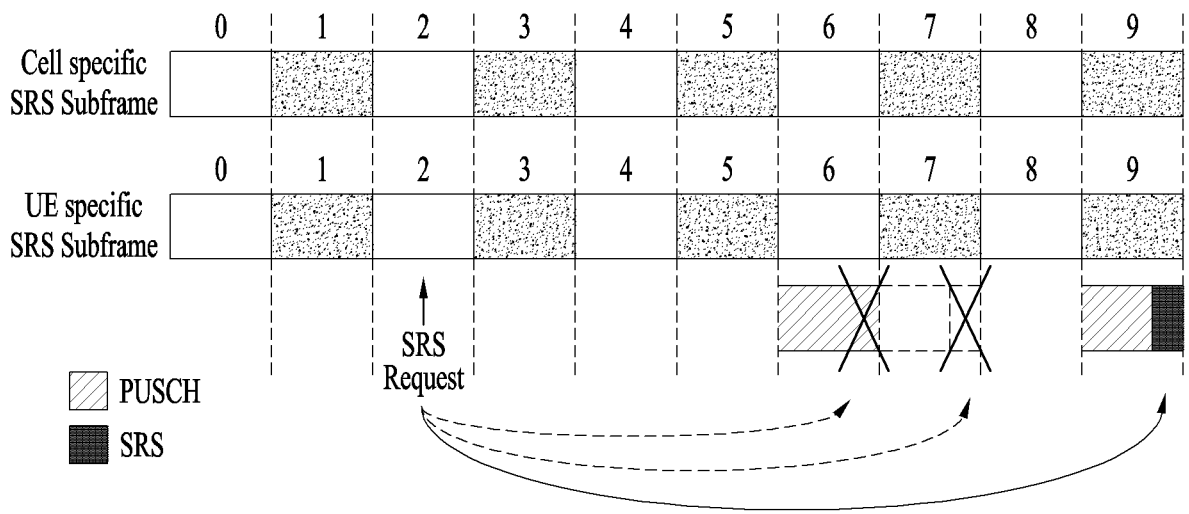

FIG. 13 is a view showing operation of transmitting an SRS according to another embodiment of the present invention.

In FIG. 13, subframes corresponding to subframe indices 1, 3, 5, 7 and 9 are commonly included in the subframes indicated in the cell-specific SRS subframe configuration and the subframes indicated in the SRS configuration index.

In the LTE system, when the UE receives an SRS request in a subframe corresponding to subframe index 2, the UE may transmit the SRS in an earliest subframe in terms of time among subframes belonging to the cell-specific SRS subframe and the UE-specific SRS subframe among the subframes after subframe index 6. If the example of FIG. 13 is applied, the UE may transmit the SRS in the subframe corresponding to subframe index 7.

However, in the LAA system, since the UE can efficiently transmit the SRS only when there is actual uplink traffic, the UE may transmit the SRS in a subframe in which the PUSCH is transmitted (e.g., the subframe corresponding to subframe index 9, in FIG. 13).

Additionally, the UE according to the present invention may transmit the SRS in a subframe in which the PUSCH to be transmitted after the SRS symbol in which the SRS is transmitted is present even with respect to SRS triggering type 1 in consideration of the transmission gap like the first embodiment.

3.3 Third Embodiment

When the UE receives an uplink grant including an SRS request in an n-th subframe, the UE is configured to transmit the SRS only in an (n+K)-th subframe. At this time, as the SRS, an SRS of triggering type 1 is applicable.

Additionally, when the UE transmits the SRS, the following conditions related to whether the PUSCH (or the PUCCH) is transmitted may be considered.

(1) The SRS is transmitted only when the PUSCH (or the PUCCH) is transmitted in the (n+K)-th subframe and, otherwise, SRS transmission is omitted.

(2) The SRS is transmitted only when the PUSCH (or the PUCCH) is transmitted immediately after the SRS symbol in which the SRS is transmitted and, otherwise, SRS transmission is omitted.

(3) The SRS is transmitted only when the PUSCH (or the PUCCH) is transmitted immediately before or after the SRS symbol in which the SRS is transmitted and, otherwise, SRS transmission is omitted.

However, among the above conditions, if SRS transmission is allowed only when the PUSCH (or the PUCCH) is transmitted immediately after the SRS symbol in which the SRS is transmitted, the UE may perform UL LBT before the SRS symbol and transmit the SRS and the PUSCH only when channel access succeeds.

In the present invention, K may be set to one of the following values:
1) a value pre-agreed with the base station;
2) a value set by the base station as a higher layer signal; and
3) a value indicated by the base station as a dynamic control signal (e.g., downlink control information (DCI))

In the LTE system proposed in the present invention, an SRS request for SRS triggering type 1 may be included and transmitted in an uplink grant indicating PUSCH transmission. Therefore, when SRS transmission is performed only when another detectable uplink signal is present in consideration of opportunistic transmission in the LAA system according to the present invention, the UE may transmit the SRS only in the subframe indicating PUSCH transmission in the uplink grant including the SRS request.

If the third embodiment of the present invention is applied, the cell-specific SRS subframe and the UE-specific SRS subframe for the SRS corresponding to SRS triggering type 1 are not applied.

Figure 14:
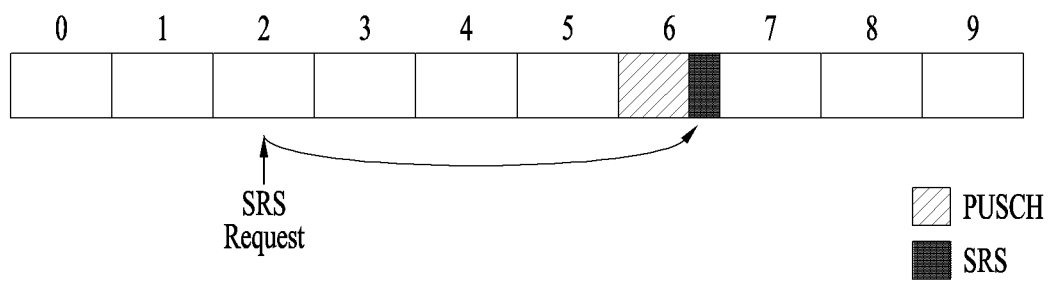

FIG. 14 is a view showing operation of transmitting an SRS according to another embodiment of the present invention.

As shown in FIG. 14, a UE may transmit a PUSCH and an SRS in a subframe after a predetermined time from a subframe in which an SRS request has been received.

At this time, when only the SRS is transmitted (when the SRS is transmitted without the PUSCH), DCI used for only SRS triggering is newly applicable in the embodiment applicable to the present invention.

3.4 Fourth Embodiment

In addition to the conditions of the first to third embodiments, the UE transmits the SRS only in a subframe which is not a (start or end) partial subframe.

In the LAA system, to which the present invention is applied, a predetermined time gap, that is, a transmission gap, in which signal transmission is not performed may be configured in some subframes such that the base station or the UE transmits a signal in consecutive subframes. At this time, in the present invention, for convenience of description, a subframe in which the transmission gap is configured is referred to as a partial subframe. In particular, a subframe in which a transmission gap is configured at front symbols in terms of time is referred to as a start partial subframe and a subframe in which a transmission gap is configured at back symbols in terms of time is referred to as an end partial subframe.

Preferably, the UE does not perform SRS transmission in the partial subframe in which a portion of the subframe is intentionally configured as a transmission gap.

Figure 15:
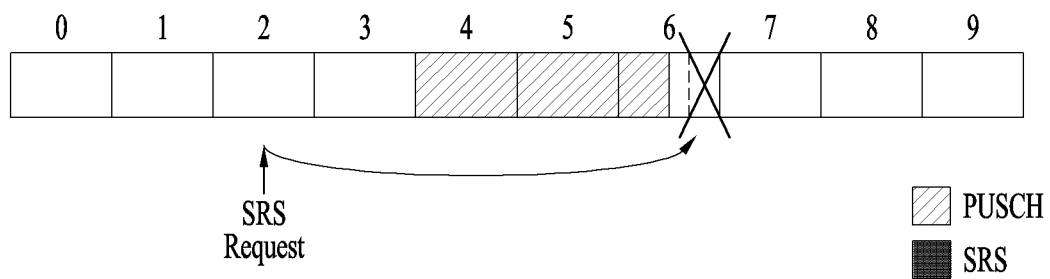

FIG. 15 is a view showing operation of transmitting an SRS according to another embodiment of the present invention.

When the UE determines a subframe in which an SRS will be transmitted according to a conventional method or the first to third embodiments, as shown in FIG. 15, since a portion of a TX gap is configured after PUSCH transmission in a subframe corresponding to subframe index 6, a node of another heterogeneous system may use a channel. Therefore, the UE may not perform SRS transmission in the subframe corresponding to subframe index 6.

Therefore, in the fourth embodiment of the present invention, the base station may impose restriction such that SRS triggering (e.g., SRS request signal transmission, etc.) is not performed in the partial subframe. Alternatively, even when the base station instructs the UE to perform (periodic or aperiodic) SRS transmission in the partial subframe, the UE may regard the instruction as being invalid and may not perform SRS transmission.

3.5 Fifth Embodiment

The base station according to the present invention instructs the UE to perform puncturing or rate matching with respect to an SRS symbol in a specific subframe through a dynamic control signal (e.g., DCI). The base station indicates whether the specific subframe is a cell-specific SRS subframe through a dynamic control signal.

In the LAA system according to the present invention, since radio resources may be used through competition with heterogeneous systems, it is preferable to flexibly apply a downlink subframe or an uplink subframe according to the situation. In this case, it is effective to use a dynamic control signal rather than a semi-static configuration such as a cell-specific SRS subframe. For example, the base station may instruct the UE to perform puncturing or rate matching of data or a signal with respect to an SRS symbol, in which the SRS will be transmitted, in consideration of SRS transmission of another UE through an uplink grant.

More specifically, the base station signals information on resources used to transmit the SRS in the SRS symbol in advance or through the dynamic control signal and instructs the UE to perform puncturing (or rate matching) considering the SRS transmission resources in the SRS symbol when the UE transmits the PUSCH (or the PUCCH) through the dynamic control signal. For example, the base station may instruct the UE to perform puncturing or (rate matching) of the entire SRS symbol through the dynamic control signal or instruct the UE to perform puncturing (or rate matching) in consideration of only the SRS transmission resource region in the SRS symbol. The dynamic control signal indicating puncturing (or rate matching) of data to be transmitted in the SRS symbol may be an uplink grant or common DCI in the case of a PUSCH and may be a downlink grant or common DCI in the case of a PUCCH.

3.6 Sixth Embodiment

When a (cell-specific) SRS subframe is indicated as a full subframe or is not indicated as a partial subframe without separate SRS triggering, the UE transmits a PUSCH in the SRS subframe and transmits a reserved SRS resource (or a reservation signal) in the SRS symbol.

In the LTE system according to the embodiment of the present invention, in a subframe configured as a cell-specific SRS subframe, a specific UE does not perform data transmission in the SRS symbol in consideration of SRS transmission thereof and SRS transmission of another UE. At this time, when a subframe located in the middle of the subframes in which an uplink Tx burst is transmitted is configured as a cell-specific SRS subframe and SRS transmission of the UE is not instructed, if the UE does not transmit any signal in the SRS symbol in the subframe, the uplink Tx burst is stopped and thus a channel occupancy time may be shortened.

In order to solve this problem, in the present invention, when a subframe in which SRS transmission is not instructed is configured as a full subframe, the UE determines the full subframe as a subframe included in the uplink Tx burst and transmits a reserved SRS resource which may be multiplexed with the other SRSs in the SRS symbol or transmits a reservation signal outside the SRS band.

Figure 16:
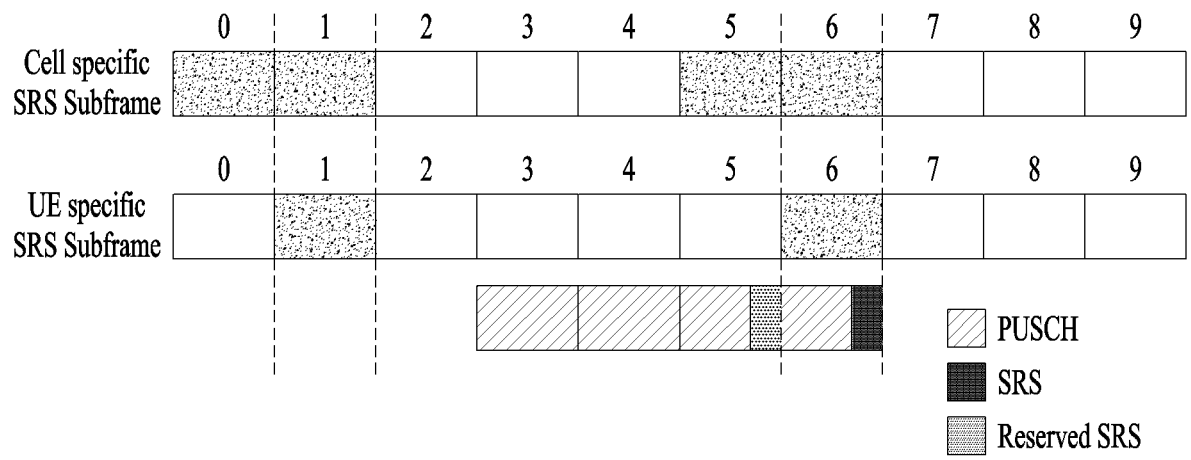

FIG. 16 is a diagram showing operation of transmitting an SRS according to another embodiment of the present invention.

As shown in FIG. 16, since a subframe corresponding to subframe index 6 is included in both a cell-specific SRS subframe and a UE-specific SRS subframe, a UE transmits an SRS corresponding to SRS triggering type 0 thereof in the subframe corresponding to subframe index 6. In addition, since a subframe corresponding to subframe index 5 is included only in the cell-specific SRS subframe, the UE may transmit a reserved SRS resource considering SRS transmission of another UE in an SRS symbol in the subframe corresponding to subframe index 5.

In another embodiment, a base station according to the present invention may instruct the UE to transmit a reserved SRS resource (or a reservation signal) in the SRS symbol through a dynamic control signal such as an uplink grant.

3.7 Seventh Embodiment

When a UE transmits only an SRS in a specific subframe, the UE transmits a reservation signal in a specific frequency region pre-set by a base station in a duration corresponding to a PUSCH resource.

At this time, the specific frequency region may be configured through a higher layer signal or a dynamic control signal.

In an LAA system according to the present invention, when the UE is allowed to transmit only an SRS (without a PUSCH) in a specific subframe, the UE may transmit a signal (hereinafter, a reservation signal) transmitted for uplink LBT and channel occupancy before SRS transmission. At this time, the reservation signal transmitted before SRS transmission may be transmitted so as not to interfere with the PUSCH resource of another UE.

To this end, the base station may configure a specific frequency region separately from a region, to which the PUSCH resource is allocated, and allow a reservation signal for SRS transmission in the specific frequency region.

Figure 17:
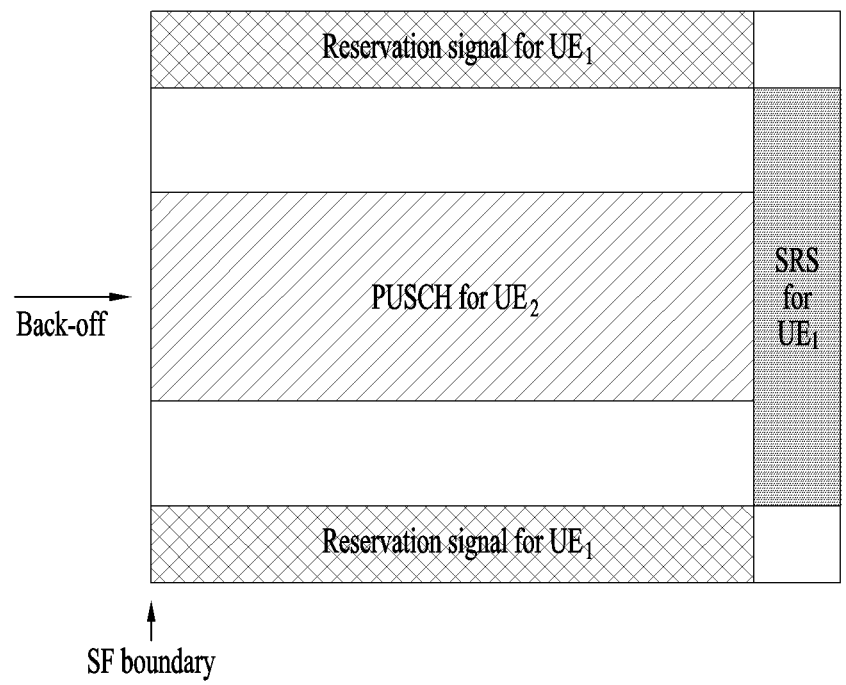

FIG. 17 is a diagram showing operation of transmitting an SRS according to another embodiment of the present invention.

As shown in FIG. 17, $UE_1$ may transmit a reservation signal in a PUSCH region (a specific frequency region pre-set by the base station) in an uplink subframe and transmit an SRS in an SRS symbol. In contrast, $UE_2$ may transmit only a PUSCH.

3.8 Eighth Embodiment

LBT parameters (e.g., a contention window size (CWS), a maximum channel occupancy time (MCOT), a back-off counter, an energy detection threshold, etc.) applied to uplink LBT operation when the UE transmits only the SRS are configured independently of LBT parameters applied to uplink LBT operation when the UE transmits the PUSCH (together with the SRS). In other words, the base station independently configures the LBT parameters applied by the UE when only the SRS is transmitted and the LBT parameters applied by the UE when the PUSCH is transmitted.

In general, when the same LBT parameter is applied in an unlicensed band, the channel occupancy time may be increased as the COT length of the signal to be transmitted by the UE is increased. As a method of dividing the channel occupancy time as equally as possible, the larger the COT, the larger the CWS. In the case where the COT is very short, the CWS may be set relatively small. In particular, when only the SRS is transmitted, since the COT is one symbol and is very short, the LBT parameters for SRS-only transmission may be set more advantageously than the LBT parameters for PUSCH transmission. For example, in the case of SRS-only transmission, the CWS of the LBT parameters may be set smaller as compared to PUSCH transmission.

As another example, uplink LBT operation when only the SRS is transmitted may be defined independently of uplink LBT operation when the PUSCH is transmitted (together with the SRS). For example, LBT for the SRS may be defined as performance of CCA for a single time slot. In other words, the UE may transmit the SRS when the channel is idle and may not transmit the SRS when the channel is busy, in one CCA slot immediately before SRS transmission.

As another example, the energy detection threshold upon performing LBT for the SRS may be set higher than the energy detection threshold upon performing LBT for PUSCH transmission.

3.9 Ninth Embodiment

If uplink LBT performed by a UE before PUSCH transmission fails in a configuration in which an SRS is transmitted subsequent to the PUSCH after uplink LBT is performed, the UE performs one of the following operations:

(1) Uplink LBT operation performed before PUSCH transmission is continuously performed to attempt SRS-only transmission (2) Uplink LBT operation is performed independently of uplink LBT performed before PUSCH transmission to attempt SRS-only transmission (3) SRS transmission is omitted.

In the configuration in which the SRS is transmitted subsequent to the PUSCH after performing uplink LBT, when uplink LBT operation performed by the UE before PUSCH transmission fails (that is, channel occupancy failure), the UE should determine whether SRS transmission is also relinquished.

Therefore, in the present invention, when the UE fails in uplink LBT for PUSCH transmission, the uplink LBT may be inherited and used to transmit only the SRS.

Alternatively, as in the eighth embodiment, separate fast uplink LBT operation for transmitting only the SRS is applicable independently of uplink LBT performed before PUSCH transmission. Therefore, when uplink LBT performed before PUSCH transmission fails, the UE may perform separate (fast) uplink LBT again and transmit only the SRS.

Alternatively, if the SRS is not allowed to be transmitted alone, the UE may omit SRS transmission.

3.10 Tenth Embodiment

In a configuration in which a PUSCH is transmitted subsequent to an SRS after performing uplink LBT, when a UE fails in uplink LBT performed before SRS transmission, the UE performs one of the following operations.

(1) Uplink LBT operation performed before SRS transmission is continuously performed to attempt PUSCH-only transmission (2) Uplink LBT operation is performed independently of uplink LBT performed before SRS transmission to attempt PUSCH-only transmission (3) PUSCH transmission is omitted.

On the contrary to the ninth embodiment, in a configuration (or a structure) in which a PUSCH is transmitted subsequent to an SRS after performing uplink LBT, when the UE fails in uplink LBT operation performed before SRS transmission (that is, channel occupancy failure), the UE should determine whether PUSCH transmission is also relinquished.

Figure 18:
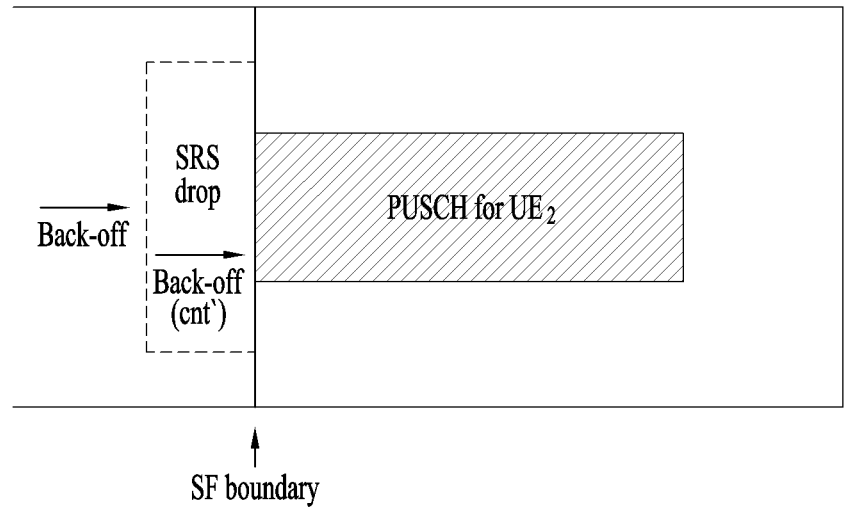

FIG. 18 is a diagram showing operation of transmitting an SRS according to another embodiment of the present invention.

As shown in FIG. 18, when uplink LBT operation for SRS transmission fails, the UE according to the present invention may continuously perform uplink LBT operation performed before SRS transmission in an SRS symbol to attempt PUSCH transmission.

Alternatively, the UE may regard the result of uplink LBT performed before SRS transmission as the result of uplink LBT for PUSCH transmission and omit PUSCH transmission.

3.11 Eleventh Embodiment

The present invention proposes a method of setting uplink timing for SRS transmission as follows:

(1) When SRS transmission is instructed in a subframe in which uplink transmission is instructed through an uplink grant, a base station may indicate the position of an SRS transmission symbol in the subframe through the uplink grant. Puncturing or rate matching is applicable to data in a region selected as the SRS symbol.

(2) When SRS transmission is instructed in an (end) partial subframe, an SRS transmission symbol position is changed immediately after a time when the partial subframe ends.

(3) When SRS transmission is instructed in an (end) partial subframe, an SRS transmission symbol position is changed to a last symbol in the partial subframe.

In the case where a partial subframe is introduced in an LAA system, to which the present invention is applied, a method of changing the position of the SRS symbol such that the SRS is transmitted continuously to the PUSCH transmitted in the partial subframe may be considered.

For example, when the base station indicates a specific subframe as a partial subframe, the UE may assume a symbol immediately after the partial subframe ends as an SRS transmission symbol position.

Similarly to the third embodiment, when only SRS transmission is allowed in a specific uplink subframe corresponding to an SRS request, the base station may directly inform the UE of the position of the SRS transmission symbol through a bit field in DCI.

3.12 Twelfth Embodiment

In the case where the UE transmits an SRS (or a periodic SRS) corresponding to SRS triggering type 0 and PUSCH transmission is not performed in a subframe (hereinafter, referred to as SRS subframe) configured by the base station in advance to transmit SRS triggering type 0, the UE transmits only an SRS (SRS only) in the SRS subframe when one of the following conditions is satisfied.

(1) When the SRS subframe is not identified as a downlink subframe, the UE transmits an SRS in the SRS subframe. For example, when a cell-specific reference signal (CRS) is not detected in a first or second symbol, the UE may transmit the SRS in the SRS subframe. At this time, when the SRS subframe is identified as a downlink subframe, the UE may not perform SRS transmission.

(2) When the SRS subframe is identified as a downlink subframe and is an (end) partial subframe having N symbols or less, the UE transmits the SRS in the SRS subframe. For example, the above configuration is applicable to the case where the UE transmits the SRS in the last symbol of a specific subframe.

(3) When the SRS subframe is identified as a downlink subframe and is a (start) partial subframe having N symbols or less, the UE transmits the SRS in the SRS subframe. For example, the above configuration is applicable to the case where the UE transmits the SRS in the first or second symbol of a specific subframe.

(4) When the base station indicates a specific subframe as an uplink subframe through a control signal (e.g., common DCI) or as a subframe in which downlink transmission is not performed or a subframe in which downlink reception operation does not need to be performed, the UE transmits the SRS only in the SRS subframe indicated as an uplink subframe (or the subframe in which downlink transmission is not performed or the subframe in which downlink reception operation does not need to be performed) through a control signal.

(1), (2) and (3) of the twelfth embodiment are applicable to subframes other than a subframe recognized as capable of performing SRS transmission according to condition (4).

In the LAA system according to the present invention, the case where SRS triggering type 0 (or periodic SRS) may be supported when only the SRS is transmitted (e.g., SRS only) for the purpose of configuring precoding in uplink MIMO.

In particular, in the LAA system according to the present invention, due to opportunistic transmission properties of the unlicensed band, a specific subframe may be flexibly used as a downlink subframe or an uplink subframe according to the buffer state. At this time, when the UE supports SRS-only transmission of SRS triggering type 0 (or periodic SRS), the UE recognizes all SRS transmittable subframes (that is, SRS subframes), which are configured by the base station as an SRS subframe configuration and an SRS configuration index, as potential uplink subframes. To this end, when the base station wants to perform downlink transmission in the SRS subframe, the UE may regard the SRS subframe as an uplink subframe and thus may not perform PDCCH and PDSCH reception operation.

Accordingly, in the present invention, the UE may not always regard the SRS subframe for SRS triggering type 0 as an uplink subframe and may transmit only the SRS in the subframe when the SRS subframe is not a downlink subframe or is an ending partial downlink subframe as the result of determining whether the SRS subframe is a downlink subframe. At this time, the UE may determine whether a CRS is detected in a first or second symbol of the SRS subframe in order to determine whether the SRS subframe is a downlink subframe.

Figure 19:
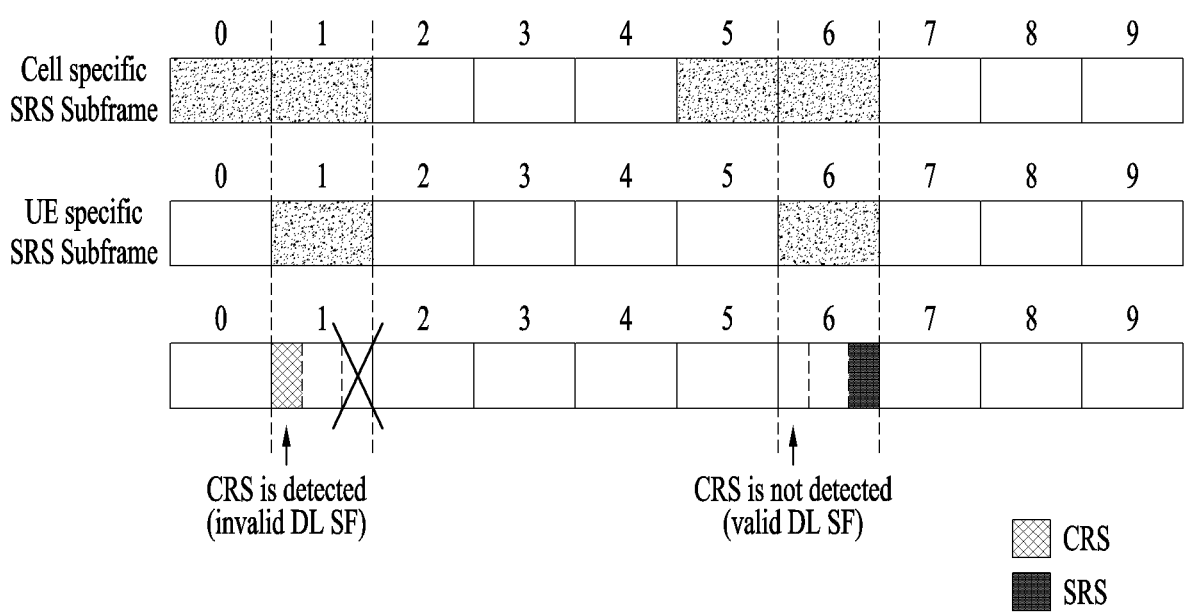

FIG. 19 is a diagram showing operation of transmitting an SRS according to another embodiment of the present invention.

As shown in FIG. 19, the UE according to the present invention may transmit an SRS only in a subframe, in which the CRS is not detected, among SRS subframes.

As another embodiment, when the base station informs the UE whether a specific subframe is an uplink subframe through a control signal, the UE transmits only the SRS only in an SRS subframe configured as the uplink subframe according to the control signal.

As another embodiment, when the base station configures SRS subframes for SRS triggering type 0 for the UE, the UE may regard all the configured SRS subframes as uplink subframes. More specifically, the UE may regard a cell-specific SRS subframe (that is, a subframe configured as an SRS subframe configuration) as a downlink subframe or an uplink subframe according to the downlink/uplink grant and always regard a UE-specific SRS subframe (that is, a subframe corresponding to both an SRS subframe configuration and an SRS configuration index) as an uplink subframe.

3.13 Thirteenth Embodiment

When a PUSCH or SRS is transmitted using one or more of N interlaces (according to a block-interleaved frequency division multiple access (IFDMA) method), the base station provides the UE with information on interlace resources used to transmit the SRS in the SRS symbol through one of the following methods:

(1) The base station (semi-statically) configures interlace resources for SRS transmission through a higher layer signal.

(2) The base station configures candidate sets of interlace resources for SRS transmission through the higher layer signal and (dynamically) indicates one of the candidate sets through an uplink grant (or common DCI).

At this time, the base station may provide the UE with information on subframes, in which SRS transmission resources are present, through the following methods, in order to indicate whether rate matching (or puncturing) considering interlace resources for SRS transmission in the SRS symbol should be performed for PUSCH (or PUCCH) transmission in a specific subframe.

1) Subframes in which the SRS transmission resources are present are (semi-statically) configured through a higher layer signal.

2) Whether a subframe in which the SRS transmission resources are present is indicated through a dynamic control signal (one or more of an uplink grant, a downlink grant and common DCI).

The UE may perform rate matching (or puncturing) considering interlace resources for SRS transmission in a subframe in which SRS transmission resources are configured (or indicated) to be present.

In the LTE system according to the present invention, for uplink transmission in an unlicensed band, a block-interleaved frequency division multiple access (IFDMA) method is applicable. Hereinafter, this will be described in detail with reference to the drawings.

Figure 20:
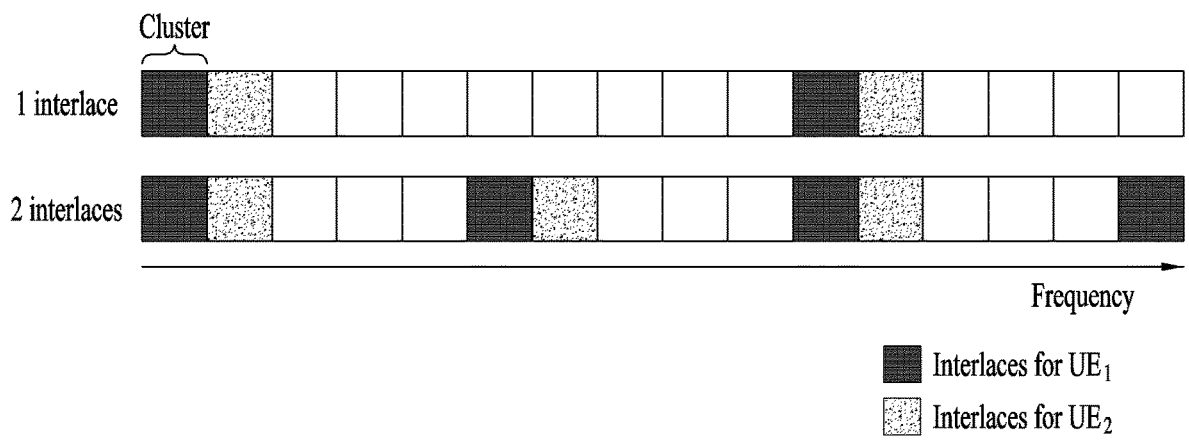
FIG. 20 is a view showing a configuration for allocating interlace resources according to a block-IFDMA method.

FIG. 20 is a view showing a configuration for allocating interlace resources according to a block-IFDMA method.

As shown in FIG. 20, if a resource region is defined in cluster units, in the block-IFDMA method, one interlace resource means a structure in which a resource is allocated to one cluster at an interval of N clusters. Therefore, in FIG. 20, the entire band may be represented by N interlaces.

Meanwhile, in the unlicensed band, there may be restrictions according to the following regulation.

1> A signal is transmitted in 80% or more of the entire band.

2> PSD (power spectral density) (or maximum transmit power at 1 MHz) is limited. For example, 10 dBm/MHz to 11 dBm/MHz may be applied.

Considering the restrictions according to the regulation, the block-IFDMA method of the present invention may solve transmit power limitation according to the regulation while transmitting an uplink signal in the entire band. At this time, when both the PUSCH and the SRS are transmitted according to the block-IFDMA method, interlace resources other than the interlace resource used to transmit the SRS resource in the SRS symbol may be used for PUSCH transmission.

Such operation may be particularly performed when a CCA period (or a CCA window) for PUSCH (or data) transmission and a CCA period (or a CCA window) for SRS transmission are configured at the same point in time.

Figure 21:
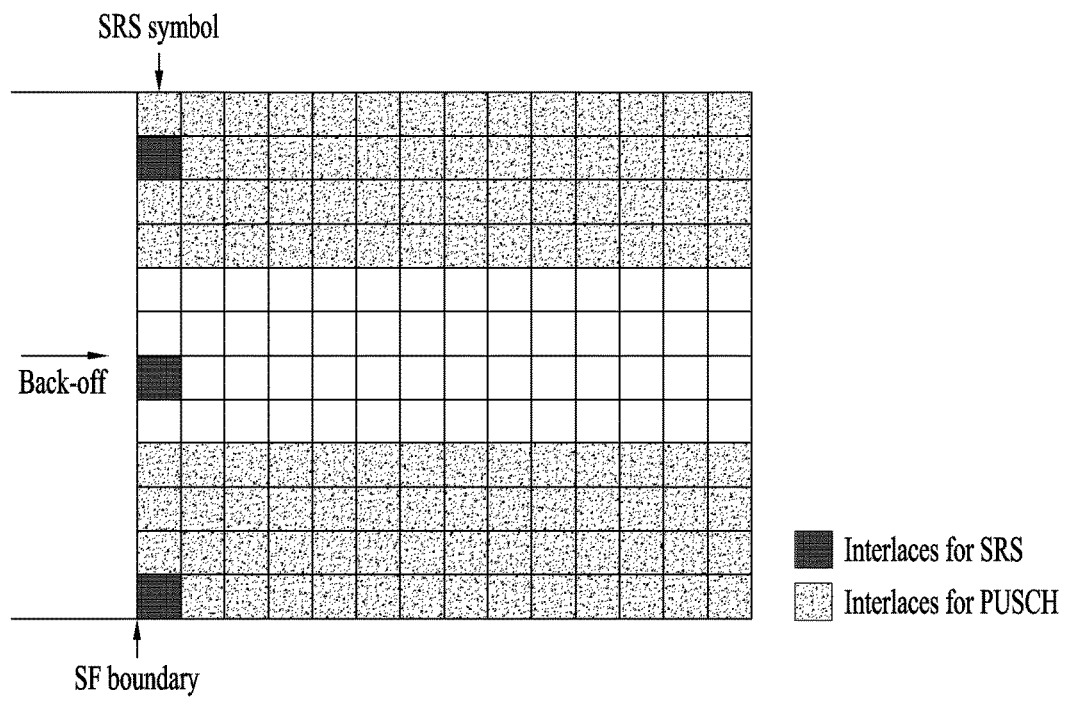
FIG. 21 is a view showing operation in which a UE transmits an SRS and a PUSCH according to the present invention.

FIG. 21 is a view showing operation in which a UE transmits an SRS and a PUSCH according to the present invention.

As shown in FIG. 21, a UE may simultaneously start SRS and PUSCH transmission after CCA succeeds. Therefore, it is possible to easily multiplex a UE for transmitting only the SRS and a UE for transmitting only the PUSCH.

As an example of configuring interlace resource for SRS transmission, the base station may configure interlace resource, which will be used for SRS transmission in the SRS symbol, in the SRS transmission subframe through a higher layer signal or indicate a specific interlace resource within a predetermined set through an uplink grant (or common DCI).

3.14 Fourteenth Embodiment

When an SRS is transmitted using one of N interlace resources (according to the block-IFDMA method), a UE performs SRS hopping within the N interlace resources as follows.

(1) SRS hopping is performed in a manner of shifting one interlace resource on a frequency axis (in units of N clusters) (every SRS transmission period)

(2) Bit reserve order (BRO) interleaver based SRS hopping is performed.

At this time, one of the following options is applicable to BRO interleaver based SRS hopping.

(2)-1. Option 1

1> When the number of interlace resources available for SRS transmission is M, indices of 0 to M−1 are set for resources.

2> An ordered set S is composed of the remaining M values excluding decimally represented values, which are not less than M, among the output sequence indices of ceil($\log_2$(M))-bit BRO interleaver. Here, the cell (x) function indicates a smallest integer greater than or equal to x.

3> An n-th element of the ordered set S indicates an interlace index in an n-th SRS period.

(2)-2. Option 2

1> When the number of interlace resources available for SRS transmission is M, indices 0 to M1 are set for the resources.

2> An ordered set S is composed of $2^M$ decimally represented values among the output sequence indices of ceil ($\log_2$(M))-bit BRO interleaver. Here, the ceil (x) function indicates a smallest integer greater than or equal to x.

3> An n-th element of the ordered set S indicates an interlace index in an n-th SRS period and, when M or more interlace indices are indicated, SRS transmission of a corresponding point in time is omitted.

As described above, if the block-IFDMA is applied in the LAA uplink system, the SRS may be transmitted using one interlace resource defined in the block-IFDMA as shown in FIG. 21. At this time, if periodic SRS transmission is supported in an unlicensed band, in order to evenly perform channel estimation in the entire band, SRS hopping in which the interlace resource for SRS transmission is changed every period may be considered.

Therefore, the present invention proposes an SRS hopping method of shifting one interlace resource in a frequency axis direction.

Figure 22:
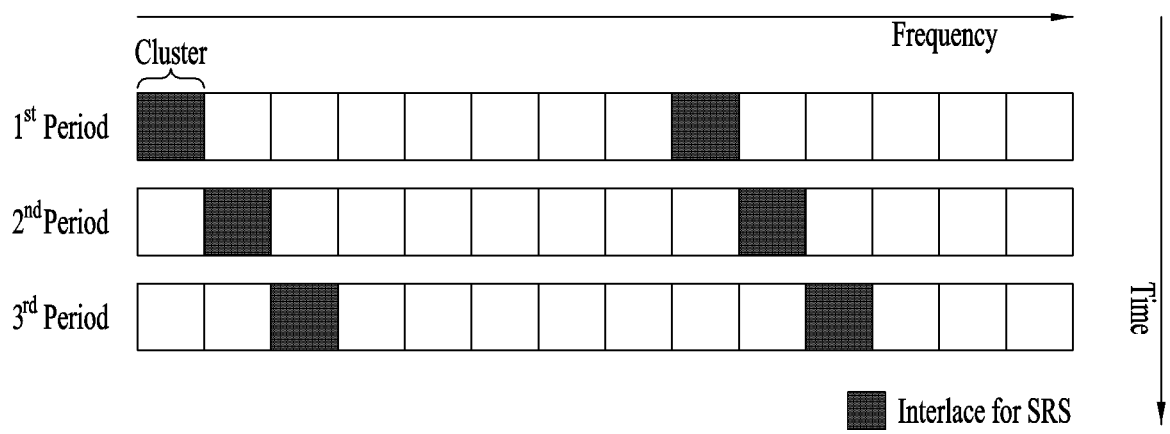
FIG. 22 is a view showing an SRS hopping method according to an example of the present invention.

FIG. 22 is a view showing an SRS hopping method according to an example of the present invention.

As shown in FIG. 22, a UE may apply SRS hopping which frequency-shifts in units of one cluster every period and transmit an SRS. In other words, a base station may receive the SRS, to which SRS hopping which frequency-shifts in units of one cluster is applied.

As another method, in the present invention, SRS hopping according to a bit reverse order (BRO) interleaver may be considered. In the BRO method, the input sequence index of the interleaver is expressed in bits and a value represented in decimal in reverse order is set as the output sequence index of the interleaver. For example, if the size of the interleaver is 8 bits, input indices are 0(000), 1(001), 2(010), 3(011), 4(100), 5(101), 6(110) and 7(111) and output indices are 0(000), 4(100), 2(010), 6(110), 1(001), 5(101), 3(011) and 7(111).

As the above-described BRO-based SRS hopping method according to Option 1, the number M of interlace resources available for SRS transmission and the index of each interlace are set (e.g., 0, 1, 2, . . . , M−1), the ordered set is composed of the remaining M values excluding decimally represented values, which are not less than M, among the output sequence indices of ceil($\log_2$(M))-bit BRO interleaver, and the n-th element of the ordered set S indicates the interlace index in the n-th SRS period. For example, in the case of M=10, the output sequence index of the 4-bit BRO interleaver may be expressed as shown in Table 6.

TABLE 6

| Input sequence index | Output sequence index |
| --- | --- |
| 0000 (0) | 0000 (0) |
| 0001 (1) | 1000 (8) |
| 0010 (2) | 0100 (4) |
| 0011 (3) | 1100 (12) * |
| 0100 (4) | 0010 (2) |
| 0101 (5) | 1010 (10) * |
| 0110 (6) | 0110 (6) |
| 0111 (7) | 1110 (14) * |
| 1000 (8) | 0001 (1) |
| 1001 (9) | 1001 (9) |
| 1010 (10) | 0101 (5) |
| 1011 (11) | 1101 (13) * |
| 1100 (12) | 0011 (3) |
| 1101 (13) | 1011 (11) * |
| 1110 (14) | 0111 (7) |
| 1111 (15) | 1111 (15) * |

When the ordered set is composed of the remaining values excluding values greater than or equal to 10 (values denoted by * in Table 6) among decimal values corresponding to the output sequence index, {0, 8, 4, 2, 6, 1, 9, 5, 3, 7} may be configured. At this time, the UE may interpret the n-th element of the ordered set as the index of the interlace resource for SRS transmission in the n-th SRS transmission period.

Figure 23:
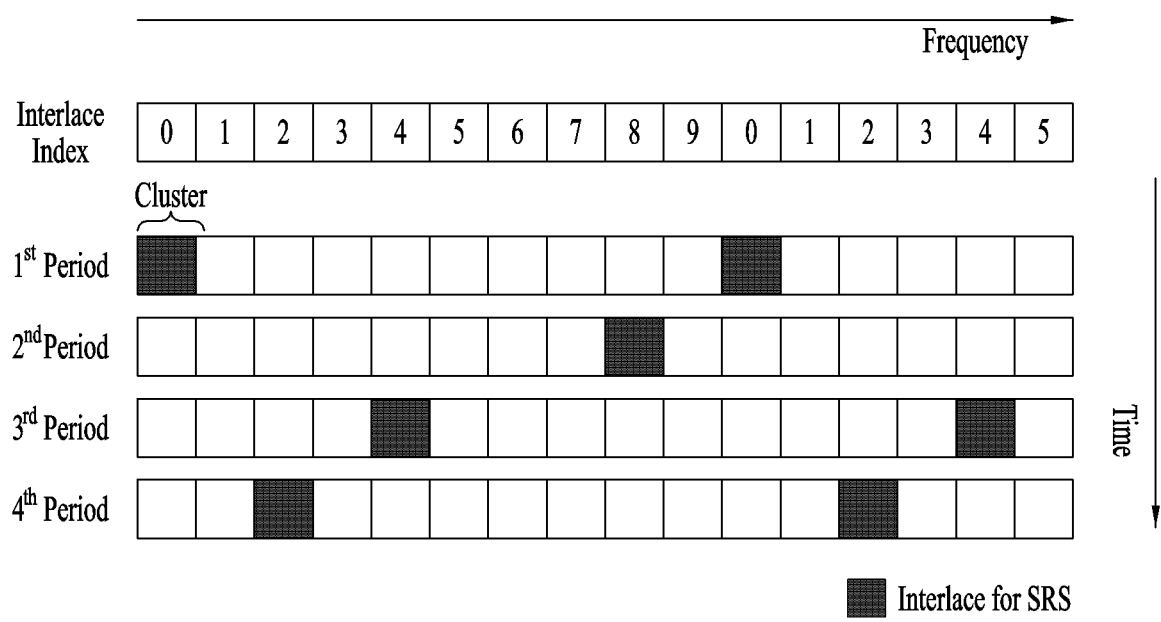
FIG. 23 is a view showing operation of selecting an interlace index and hopping an SRS according to an embodiment of the present invention.

FIG. 23 is a view showing operation of selecting an interlace index and hopping an SRS according to an embodiment of the present invention.

As shown in FIG. 23, the interlace index may be selected according to the ordered set {0, 8, 4, 2, . . . } acquired from Table 6 to apply SRS hopping.

As the above-described BRO-based SRS hopping method according to Option 2, the number M of interlace resources available for SRS transmission and the index of each interlace are set (e.g., 0, 1, 2, ..., M−1), the ordered set having $2^M$ elements is composed of the decimally represented values among the output sequence indices of ceil($\log_2$(M))-bit BRO interleaver, and the n-th element of the ordered set S indicates the interlace index in the n-th SRS period. At this time, when the interlace index equal to or greater than M among the elements of the ordered set is indicated (e.g., if N is indicated), SRS transmission in the corresponding SRS transmission period may be omitted or SRS transmission may be performed in the interlace index corresponding to a value obtained by performing modulo operation on the N value with M. For example, in the case of M=10, the ordered set is {0, 8, 4, 12, 2, 10, 6, 14, 1, 9, 5, 13, 3, 11, 7, 15}, and when the interlace index equal to or greater than M is indicated, SRS transmission may be omitted.

Figure 24:
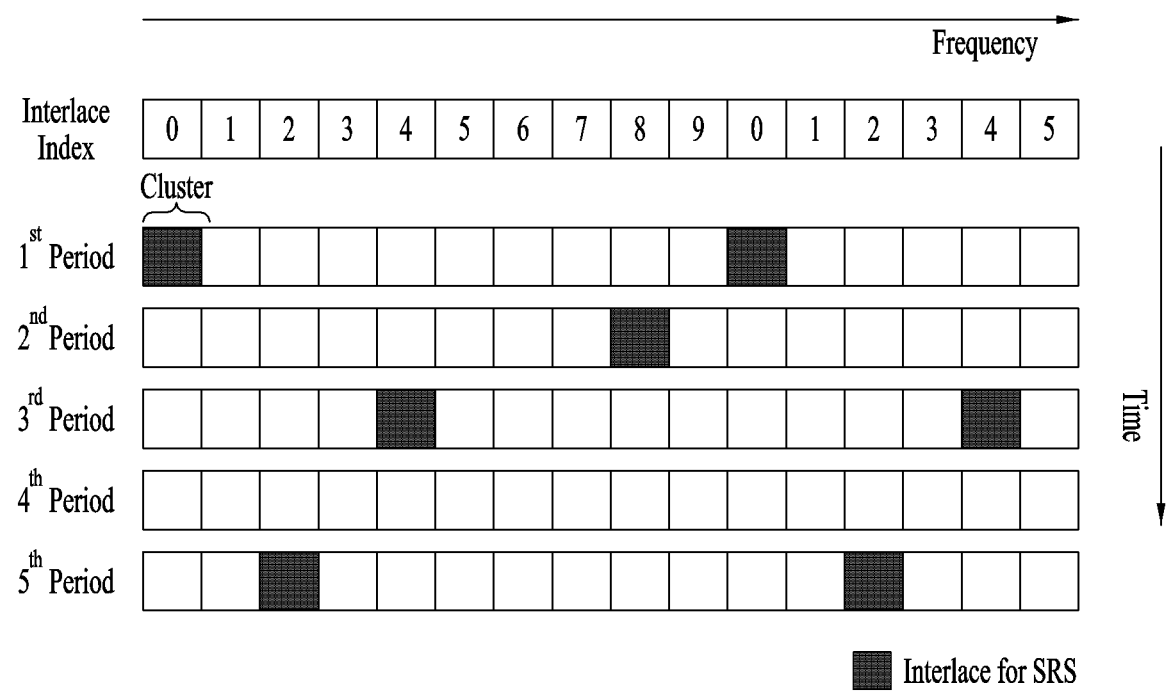
FIG. 24 is a view showing operation of selecting an interlace index and hopping an SRS according to another embodiment of the present invention.

FIG. 24 is a view showing operation of selecting an interlace index and hopping an SRS according to another embodiment of the present invention.

As shown in FIG. 24, the interlace index may be selected according to the ordered set {0, 8, 4, 12, 2, ... } acquired based on operation according to Option 2 to apply SRS hopping.

3.15 Fifteenth Embodiment

When the SRS is transmitted using one of N interlace resources (according to the block-IFDMA method) and the cyclic shift (CS) applied to the SRS is represented by $\alpha=2\pi \cdot n_{CS}/L$ (where, $n_{CS}$ is a cyclic shift parameter), the L value of the CS to be applied to the SRS is differently set according to a repetition factor (RPF) (or the number of transmission combs).

The CS may be applied in a state of assuming that the block-IFDMA resources, to which the SRS is allocated, are concatenated.

In the LTE system, an SRS sequence is configured using a Zadoff-Chu sequence which is a type of constant amplitude zero autocorrelation (CAZAC) sequence, and the SRS transmitted through the same resource according to the characteristics of the CAZAC sequence may be divided into different CSs. In particular, in the Rel-8 LTE system, the minimum resource allocation number of the SRS is 4 RBs and, when the transmission comb is 2, 24 subcarriers are present in the minimum SRS resource size, thereby configuring a 24-length SRS sequence. Considering this, the CS applied to the SRS may be defined as $\alpha=2\pi \cdot n_{CS}/8$, and the base station may indicate the CS applied to the SRS among 8 different CSs through the cyclic shift parameter.

Meanwhile, in LTE Rel-13, four transmission combs were introduced in order to support FD-MIMO (full dimension MIMO). At this time, the number of subcarriers within 4 RBs which are minimum SRS resources is reduced to 12 and the CS corresponding to L=8 cannot be applied. Accordingly, eight CSs are selected from among CSs corresponding to L=12 and are applied.

However, as shown in FIGS. 22 to 24, when the SRS is transmitted according to the block-IFDMA method, the minimum resource allocation size of the SRS is changed and thus setting of a new L value is necessary. For example, when 10 interlaces of 100 RBs within 20 MHz are supported, the minimum resource allocation size for the SRS becomes 10 RBs and, even in this case, the length of the SRS sequence is set to 30 in order to support four transmission combs. However, in this case, all the CSs corresponding to L=8 and 12 cannot be applied and the CS corresponding to L=6 should be applied.

In the present invention, when the SRS is transmitted using one of N interlace resources (according to the block-IFDMA method) and the cyclic shift (CS) applied to the SRS is represented by $\alpha=2\pi \cdot n_{CS}/L$ (where, $n_{CS}$ is a cyclic shift parameter), the L value of the CS to be applied to the SRS is differently set according to a repetition factor (RPF) applied in the interlace resources.

3.16 Sixteenth Embodiment

The base station informs the UE of the LBT operation for SRS-only transmission through SRS triggering DCI (e.g., an uplink grant or a downlink grant).

For coexistence with the other radio access technologies in the unlicensed band, LBT operation (e.g., Cat. 4 LBT) equivalent to PUSCH transmission during SRS transmission in the LAA SCell may be considered. However, in a situation in which downlink MCOT is reserved for downlink transmission of the base station, SRS transmission may be performed based on LBT operation (e.g., single CCA slot based LBT) advantageous for channel access on the downlink MCOT.

As described above, when the LBT operation to be applied to the SRS is changed according to the SRS transmission condition, the base station should inform the UE of which LBT is applied for SRS transmission or that an SRS to be transmitted at a specific point in time is in the downlink MCOT. In the former case, the base station may indicate the LBT operation for the SRS in the DCI (uplink grant or downlink grant) indicating SRS transmission. In the latter case, the base station may inform the UE that SRS transmission indicated in the current subframe is in the downlink MCOT through the common DCI and thus the UE may apply faster LBT operation to the SRS.

3.17 Seventh Embodiment

In the case where the UE transmits the SRS, only when (continuous) PUSCH (or PUCCH) transmission is not performed after the SRS, the LBT scheme which is advantageous for channel access is performed rather than LBT applied to the PUSCH. At this time, one of the following LBT operations is applicable.

(1) single CCA slot based LBT
(2) short category 4 (Short Cat.4) LBT
(For example, the short category 4 LBT may be set smaller than the category 4 LBT for PUSCH transmission by the size of the CW.)

As described above, since SRS-only transmission is 1-symbol transmission and has a shorter transmission time than PUSCH transmission, LBT advantageous for channel access may be applied rather than LBT for PUSCH transmission. For example, in order to perform SRS-only transmission, the UE may perform single CCA slot based LBT operation.

At this time, from the viewpoint of the UE, when PUSCH (or PUCCH) transmission is performed after SRS-only transmission, the UE performs single CCA slot LBT for the SRS and then sequentially transmits the SRS and the PUCCH. This is not preferable for coexistence with other radio access systems. Therefore, the present invention provides a method of performing the single CCA slot based LBT only when there is no PUSCH transmission immediately after the UE transmits only the SRS.

As another example, when the UE performs fast LBT operation such as single CCA slot based LBT for SRS-only transmission, the UE may omit PUSCH transmission performed subsequent to SRS-only transmission.

4. Device Configuration

Figure 25:
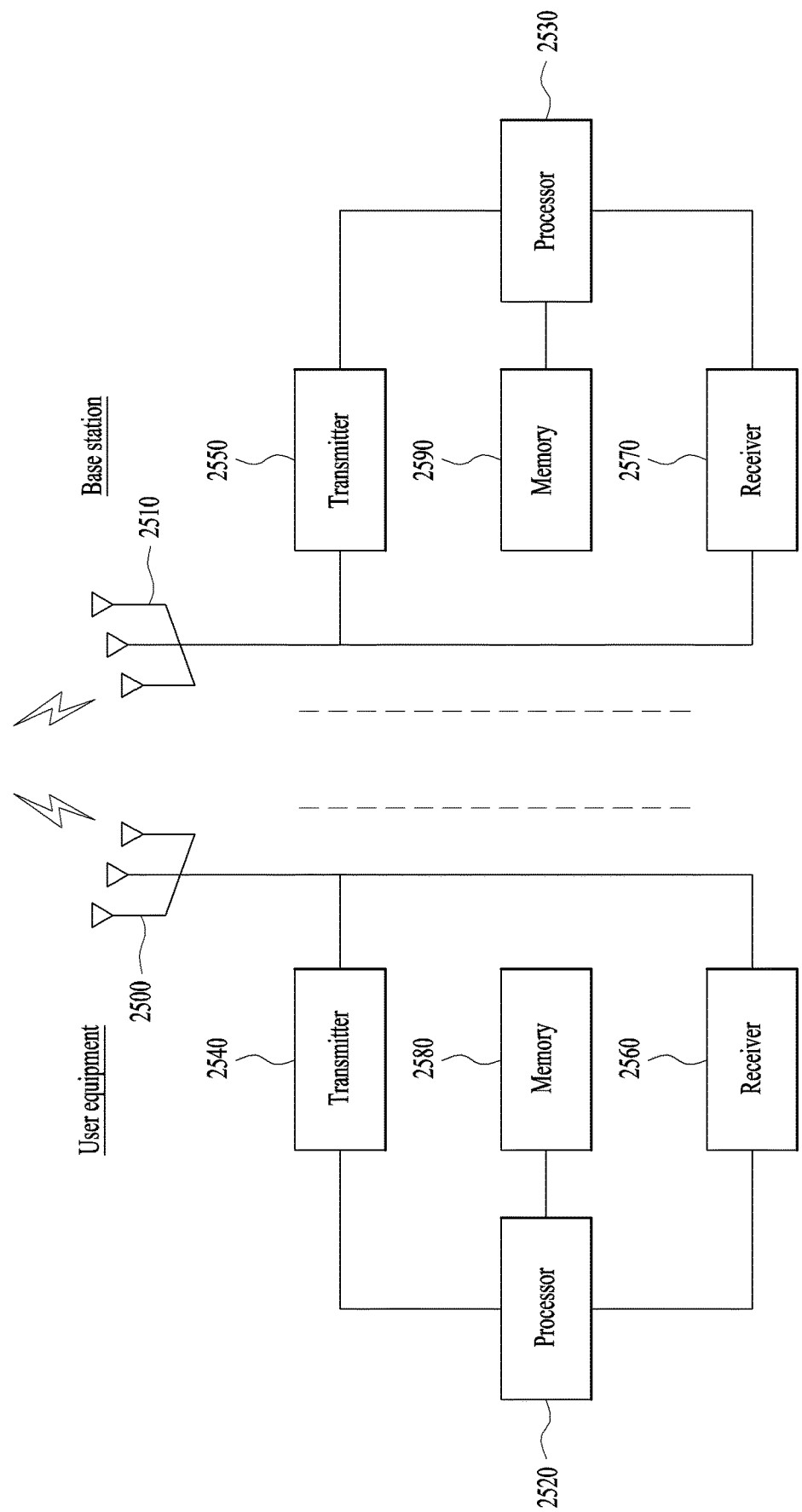
FIG. 25 is a view showing the configurations of a UE and a base station in which the proposed embodiments may be implemented.

FIG. 25 is a diagram illustrating configurations of a UE and a base station capable of being implemented by the embodiments proposed in the present invention. The UE and the base station shown in FIG. 25 operate to implement the embodiments of the SRS transmission and reception method between the UE and the base station.

A UE may act as a transmission end on a UL and as a reception end on a DL. A base station (eNB) may act as a reception end on a UL and as a transmission end on a DL.

That is, each of the UE and the base station may include a Transmitter (Tx) 2540 or 2550 and a Receiver (Rx) 2560 or 2570, for controlling transmission and reception of information, data, and/or messages, and an antenna 2500 or 2510 for transmitting and receiving information, data, and/or messages.

Each of the UE and the base station may further include a processor 2520 or 2530 for implementing the afore-described embodiments of the present disclosure and a memory 2580 or 2590 for temporarily or permanently storing operations of the processor 2520 or 2530.

The UE receives first DL control information indicating whether a type of scheduling uplink signal transmission for one or more subframes corresponds to scheduling of a first type or scheduling of a second type from the base station via the processor 2520. If the first DL control information indicates the scheduling of the first type, the UE can be configured to transmit an uplink signal in one or more subframes which are configured on the basis of the reception timing of the first DL control information. If the first DL control information indicates the scheduling of the second type, the UE can be configured to receive second DL control information indicating UL signal transmission for one or more subframes from the base station and transmit the uplink signal in one or more subframes which are configured on the basis of the reception timing of the second DL control information.

The base station transmits first DL control information indicating whether a type of scheduling uplink signal transmission for one or more subframes corresponds to scheduling of a first type or scheduling of a second type to the UE via the processor 2530. If the first DL control information indicates the scheduling of the first type, the base station can be configured to receive an uplink signal in one or more subframes which are configured on the basis of the reception timing of the first DL control information. If the first DL control information indicates the scheduling of the second type, the base station can be configured to transmit second DL control information indicating UL signal transmission for one or more subframes to the UE and receive the uplink signal in one or more subframes which are configured on the basis of the reception timing of the second DL control information.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 25 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1880 or 1890 and executed by the processor 1820 or 1830. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present invention can be applied to various wireless access systems including 3GPP (3rd Generation Partnership Project) and 3GPP2 system. The embodiments of the present invention can be applied not only to various wireless access systems but also to all technical fields to which the various wireless access systems are applied. Further, the proposed method can also be applied to an mmWave communication system using ultra-high frequency band.

The invention claimed is:
1. A method of transmitting a sounding reference signal (SRS) from a user equipment (UE) to a base station in a wireless communication system supporting an unlicensed band, the method comprising:
- receiving from the base station, resource information indicating an interlace resource for transmitting the SRS; and
- based on a result of Listen-Before-Talk (LBT) with respect to the unlicensed band, transmitting the SRS in the interlace resource indicated by the resource information through the unlicensed band,
- wherein when the SRS corresponds to a periodic SRS, the UE transmits the SRS in an interlace resource determined according to a specific pattern in following SRS periodicity, based on the interlace resource indicated by the resource information, and
- wherein the UE transmits the SRS in an interlace resource determined by a Bit Reverse Order (BRO) interleaving method in the following SRS periodicity, based on the interlace resource indicated by the resource information.

2. The method of claim 1, wherein the receiving the resource information comprises:
- receiving from the base station, candidate set information indicating candidates with respect to a plurality of interlace resources for transmitting the SRS via a higher layer signaling; and
- receiving from the base station, interlace resource information indicating one interlace resource among the plurality of the interlace resources via a downlink control information (DCI).

3. The method of claim 1, wherein the SRS, transmitted in the interlace resource indicated by the resource information, is transmitted on a SRS symbol in a time domain.

4. The method of claim 1, wherein the UE further transmits a Physical Uplink Shared Channel (PUSCH) signal through the unlicensed band in the resources that the SRS is not transmitted, based on the result of LBT with respect to the unlicensed band.

5. The method of claim 1, wherein one interlace resource corresponds to a plurality of resource blocks (RBs) spaced by a unit of 10 RBs in a frequency domain.

6. The method of claim 5, wherein when entire bandwidth corresponds to 100 RBs, the one interlace resource corresponds to 10 RBs spaced by the unit of 10 RBs among the entire bandwidth in the frequency domain.

7. The method of claim 6, wherein when 4 transmission combs are supported with respect to the SRS, the SRS is composed of a Zadoff-Chu sequence having 30 lengths.

8. A method of receiving a sounding reference signal (SRS) from a user equipment (UE) by a base station in a wireless communication system supporting an unlicensed band, the method comprising:
- transmitting to the UE, resource information indicating an interlace resource for transmitting the SRS; and
- based on a result of Listen-Before-Talk (LBT) with respect to the unlicensed band, receiving the SRS in the interlace resource indicated by the resource information through the unlicensed band,
- wherein when the SRS corresponds to a periodic SRS, the UE transmits the SRS in an interlace resource determined according to a specific pattern in following SRS periodicity, based on the interlace resource indicated by the resource information, and
- wherein the UE transmits the SRS in an interlace resource determined by a Bit Reverse Order (BRO) interleaving method in the following SRS periodicity, based on the interlace resource indicated by the resource information.

9. A user equipment (UE) for transmitting a sounding reference signal (SRS) to a base station in a wireless communication system supporting an unlicensed band, the UE comprising:
- a receiver;
- a transmitter; and
- a processor connected to the receiver and the transmitter to operate,
- wherein the processor is configured to:
- receive from the base station, resource information indicating an interlace resource for transmitting the SRS; and
- based on a result of Listen-Before-Talk (LBT) with respect to the unlicensed band, transmit the SRS in the interlace resource indicated by the resource information through the unlicensed band,
- wherein when the SRS corresponds to a periodic SRS, the UE transmits the SRS in an interlace resource determined according to a specific pattern in following SRS periodicity, based on the interlace resource indicated by the resource information, and
- wherein the UE transmits the SRS in an interlace resource determined by a Bit Reverse Order (BRO) interleaving method in the following SRS periodicity, based on the interlace resource indicated by the resource information.

10. A base station for receiving a sounding reference signal (SRS) from a user equipment (UE) in a wireless communication system supporting an unlicensed band, the base station comprising:
- a receiver;
- a transmitter; and
- a processor connected to the receiver and the transmitter to operate,
- wherein the processor is configured to:
- transmit to the UE, resource information indicating an interlace resource for transmitting the SRS; and
- based on a result of Listen-Before-Talk (LBT) with respect to the unlicensed band, receive the SRS in the interlace resource indicated by the resource information through the unlicensed band,
- wherein when the SRS corresponds to a periodic SRS, the UE transmits the SRS in an interlace resource determined according to a specific pattern in following SRS periodicity, based on the interlace resource indicated by the resource information, and
- wherein the UE transmits the SRS in an interlace resource determined by a Bit Reverse Order (BRO) interleaving method in the following SRS periodicity, based on the interlace resource indicated by the resource information.

* * * * *